United States Patent
DeWitt, Jr. et al.

(10) Patent No.: US 8,689,190 B2
(45) Date of Patent: *Apr. 1, 2014

(54) COUNTING INSTRUCTION EXECUTION AND DATA ACCESSES

(75) Inventors: Jimmie Earl DeWitt, Jr., Georgetown, TX (US); Frank Eliot Levine, Austin, TX (US); Enio Manuel Pineda, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1382 days.

This patent is subject to a terminal disclaimer.

(21) Appl. No.: 12/021,425

(22) Filed: Jan. 29, 2008

(65) Prior Publication Data

US 2008/0141005 A1    Jun. 12, 2008

Related U.S. Application Data

(63) Continuation of application No. 10/675,777, filed on Sep. 30, 2003, now Pat. No. 7,395,527.

(51) Int. Cl.
*G06F 9/45* (2006.01)
(52) U.S. Cl.
USPC .......................................... 717/127
(58) Field of Classification Search
USPC .......................................... 717/127
See application file for complete search history.

(56) References Cited

U.S. PATENT DOCUMENTS

| 2,112,794 | A | 3/1938 | Stickney |
| 3,707,725 | A | 12/1972 | Dellheim |
| 4,034,353 | A | 7/1977 | Denny et al. |
| 4,145,735 | A | 3/1979 | Soga |
| 4,291,371 | A | 9/1981 | Holtey |
| 4,316,245 | A | 2/1982 | Luu et al. |
| 4,374,409 | A | 2/1983 | Bienvenu et al. |
| 4,395,757 | A | 7/1983 | Bienvenu et al. |
| 4,558,413 | A | 12/1985 | Schmidt et al. |
| 4,590,555 | A | 5/1986 | Bourrez |
| 4,598,364 | A | 7/1986 | Gum et al. |
| 4,682,283 | A | 7/1987 | Robb |
| 4,794,472 | A | 12/1988 | Doyama |
| 4,821,178 | A | 4/1989 | Levin et al. |
| 4,825,359 | A | 4/1989 | Ohkami et al. |

(Continued)

FOREIGN PATENT DOCUMENTS

| EP | 1164475 | 12/2001 |
| JP | 10083284 | 3/1998 |

(Continued)

OTHER PUBLICATIONS

Office Action issued on Sep. 2, 2011 for U.S. Appl. No. 12/185,254.

(Continued)

*Primary Examiner* — John Chavis
(74) *Attorney, Agent, or Firm* — Yee & Associates, P.C.; David A. Mims, Jr.

(57) ABSTRACT

A data processing system for processing instructions is shown. Instructions are received at a processor in the data processing system. If a selected indicator is associated with the instruction, counting of each event associated with the execution of the instruction is enabled.

8 Claims, 12 Drawing Sheets

(56) References Cited

U.S. PATENT DOCUMENTS

| | | | |
|---|---|---|---|
| 4,912,623 A | 3/1990 | Rantala et al. |
| 4,928,222 A | 5/1990 | Vriezen et al. |
| 5,032,982 A | 7/1991 | Dalrymple et al. |
| 5,051,944 A | 9/1991 | Fetterolf et al. |
| 5,103,394 A | 4/1992 | Blasciak |
| 5,113,507 A | 5/1992 | Jaeckel |
| 5,142,634 A | 8/1992 | Fite et al. |
| 5,142,635 A | 8/1992 | Saini |
| 5,150,349 A | 9/1992 | Takai et al. |
| 5,151,981 A | 9/1992 | Westcott et al. |
| 5,206,584 A | 4/1993 | Nishimori |
| 5,212,794 A | 5/1993 | Pettis et al. |
| 5,256,775 A | 10/1993 | Froehler |
| 5,257,358 A | 10/1993 | Cohen |
| 5,276,833 A | 1/1994 | Auvinen et al. |
| 5,287,481 A | 2/1994 | Lin |
| 5,339,426 A | 8/1994 | Aoshima |
| 5,339,435 A | 8/1994 | Lubkin et al. |
| 5,355,487 A | 10/1994 | Keller et al. |
| 5,394,529 A | 2/1995 | Brown, III et al. |
| 5,404,500 A | 4/1995 | Legvold et al. |
| 5,438,670 A | 8/1995 | Baror et al. |
| 5,450,349 A | 9/1995 | Brown et al. |
| 5,463,775 A | 10/1995 | DeWitt et al. |
| 5,479,633 A | 12/1995 | Wells et al. |
| 5,537,541 A | 7/1996 | Wibecan |
| 5,537,572 A | 7/1996 | Michelsen et al. |
| 5,544,342 A | 8/1996 | Dean |
| 5,548,762 A | 8/1996 | Creedon et al. |
| 5,555,432 A | 9/1996 | Hinton et al. |
| 5,557,548 A | 9/1996 | Gover et al. |
| 5,564,015 A | 10/1996 | Bunnell |
| 5,574,872 A | 11/1996 | Rotem et al. |
| 5,581,482 A | 12/1996 | Wiedenman et al. |
| 5,581,778 A | 12/1996 | Chin et al. |
| 5,581,981 A | 12/1996 | Fulkerson et al. |
| 5,590,352 A | 12/1996 | Zuraski et al. |
| 5,594,864 A * | 1/1997 | Trauben ................. 714/39 |
| 5,603,004 A | 2/1997 | Kurpanek et al. |
| 5,628,018 A | 5/1997 | Matsuzaki et al. |
| 5,644,692 A | 7/1997 | Eick |
| 5,652,858 A | 7/1997 | Okada et al. |
| 5,657,253 A | 8/1997 | Dreyer et al. |
| 5,659,679 A | 8/1997 | Alpert et al. |
| 5,666,507 A | 9/1997 | Flora |
| 5,671,920 A | 9/1997 | Acquaviva et al. |
| 5,675,802 A | 10/1997 | Allen et al. |
| 5,684,030 A | 11/1997 | Elokdah et al. |
| 5,689,712 A | 11/1997 | Heisch |
| 5,691,920 A | 11/1997 | Levine et al. |
| 5,694,540 A | 12/1997 | Humelsine et al. |
| 5,708,803 A | 1/1998 | Ishimi et al. |
| 5,710,881 A | 1/1998 | Gupta et al. |
| 5,727,167 A | 3/1998 | Dwyer, III et al. |
| 5,740,413 A | 4/1998 | Alpert et al. |
| 5,745,770 A | 4/1998 | Thangadurai et al. |
| 5,748,878 A | 5/1998 | Rees et al. |
| 5,751,942 A | 5/1998 | Christensen et al. |
| 5,752,062 A | 5/1998 | Gover et al. |
| 5,754,839 A | 5/1998 | Pardo et al. |
| 5,758,061 A | 5/1998 | Plum |
| 5,758,168 A | 5/1998 | Mealey et al. |
| 5,758,187 A | 5/1998 | Young |
| 5,761,103 A | 6/1998 | Oakland et al. |
| 5,768,500 A | 6/1998 | Agrawal et al. |
| 5,772,322 A | 6/1998 | Burns et al. |
| 5,774,724 A | 6/1998 | Heisch |
| 5,775,825 A | 7/1998 | Hong et al. |
| 5,787,280 A | 7/1998 | Joseph et al. |
| 5,787,286 A | 7/1998 | Hooker |
| 5,794,028 A | 8/1998 | Tran |
| 5,794,052 A | 8/1998 | Harding |
| 5,796,939 A | 8/1998 | Berc et al. |
| 5,797,019 A | 8/1998 | Levine et al. |
| 5,802,378 A | 9/1998 | Arndt et al. |
| 5,802,678 A | 9/1998 | Puente |
| 5,805,879 A | 9/1998 | Hervin et al. |
| 5,815,707 A | 9/1998 | Krause et al. |
| 5,822,578 A | 10/1998 | Frank et al. |
| 5,822,763 A | 10/1998 | Baylor et al. |
| 5,822,790 A | 10/1998 | Mehrotra |
| 5,835,702 A | 11/1998 | Levine et al. |
| 5,839,050 A | 11/1998 | Baehr et al. |
| 5,855,578 A | 1/1999 | Guglielmi et al. |
| 5,857,097 A | 1/1999 | Henzinger et al. |
| 5,862,381 A | 1/1999 | Advani et al. |
| 5,872,913 A | 2/1999 | Berry et al. |
| 5,875,294 A | 2/1999 | Roth et al. |
| 5,875,334 A | 2/1999 | Chow et al. |
| 5,887,159 A | 3/1999 | Burrows |
| 5,889,947 A | 3/1999 | Starke |
| 5,896,538 A | 4/1999 | Blandy et al. |
| 5,909,573 A | 6/1999 | Sheaffer |
| 5,913,925 A | 6/1999 | Kahle et al. |
| 5,920,689 A | 7/1999 | Berry et al. |
| 5,920,721 A | 7/1999 | Hunter et al. |
| 5,923,863 A | 7/1999 | Adler et al. |
| 5,926,640 A | 7/1999 | Mason et al. |
| 5,928,334 A | 7/1999 | Mandyam et al. |
| 5,930,508 A | 7/1999 | Faraboschi et al. |
| 5,937,437 A | 8/1999 | Roth et al. |
| 5,938,760 A * | 8/1999 | Levine et al. ................. 712/220 |
| 5,938,778 A | 8/1999 | John, Jr. et al. |
| 5,940,618 A | 8/1999 | Blandy et al. |
| 5,949,971 A | 9/1999 | Levine et al. |
| 5,950,003 A | 9/1999 | Kaneshiro et al. |
| 5,950,009 A | 9/1999 | Bortnikov et al. |
| 5,966,537 A | 10/1999 | Ravichandran |
| 5,966,538 A | 10/1999 | Granston et al. |
| 5,966,539 A | 10/1999 | Srivastava |
| 5,970,439 A | 10/1999 | Levine et al. |
| 5,973,417 A | 10/1999 | Goetz et al. |
| 5,973,542 A | 10/1999 | Okayasu et al. |
| 5,978,907 A | 11/1999 | Tran et al. |
| 5,987,250 A | 11/1999 | Subrahmanyam |
| 5,987,598 A | 11/1999 | Levine et al. |
| 5,991,708 A | 11/1999 | Levine et al. |
| 5,991,908 A | 11/1999 | Baxter et al. |
| 5,996,069 A | 11/1999 | Yasoshima et al. |
| 6,006,033 A | 12/1999 | Heisch |
| 6,009,514 A | 12/1999 | Henzinger et al. |
| 6,026,235 A | 2/2000 | Shaughnessy |
| 6,063,134 A | 5/2000 | Peters et al. |
| 6,067,644 A | 5/2000 | Levine et al. |
| 6,070,009 A | 5/2000 | Dean et al. |
| 6,073,109 A | 6/2000 | Flores et al. |
| 6,073,215 A | 6/2000 | Snyder |
| 6,094,709 A | 7/2000 | Baylor et al. |
| 6,098,169 A | 8/2000 | Ranganathan |
| 6,101,524 A | 8/2000 | Choi et al. |
| 6,105,051 A | 8/2000 | Borkenhagen et al. |
| 6,105,129 A | 8/2000 | Meier et al. |
| 6,112,317 A | 8/2000 | Berc et al. |
| 6,118,448 A | 9/2000 | McMillan et al. |
| 6,119,075 A | 9/2000 | Dean et al. |
| 6,134,676 A | 10/2000 | VanHuben et al. |
| 6,145,077 A | 11/2000 | Sidwell et al. |
| 6,145,123 A | 11/2000 | Torrey et al. |
| 6,147,318 A | 11/2000 | Marhic |
| 6,148,321 A | 11/2000 | Hammond |
| 6,149,318 A | 11/2000 | Chase et al. |
| 6,161,187 A | 12/2000 | Mason et al. |
| 6,163,840 A | 12/2000 | Chrysos et al. |
| 6,182,210 B1 | 1/2001 | Akkary et al. |
| 6,185,652 B1 | 2/2001 | Shek et al. |
| 6,185,671 B1 | 2/2001 | Pentovski et al. |
| 6,189,072 B1 | 2/2001 | Levine et al. |
| 6,189,141 B1 | 2/2001 | Benitez et al. |
| 6,189,142 B1 | 2/2001 | Johnston et al. |
| 6,192,513 B1 | 2/2001 | Subrahmanyam |
| 6,195,765 B1 | 2/2001 | Kislanko et al. |
| 6,199,204 B1 | 3/2001 | Donohue |
| 6,202,199 B1 | 3/2001 | Wygodny et al. |
| 6,202,207 B1 | 3/2001 | Donohue |

(56) References Cited

U.S. PATENT DOCUMENTS

| | | |
|---|---|---|
| 6,206,235 B1 | 3/2001 | Green |
| 6,206,584 B1 | 3/2001 | Hastings |
| 6,212,675 B1 | 4/2001 | Johnston et al. |
| 6,223,338 B1 | 4/2001 | Smolders |
| 6,233,679 B1 | 5/2001 | Holmberg |
| 6,237,019 B1 | 5/2001 | Ault et al. |
| 6,237,141 B1 | 5/2001 | Holzle et al. |
| 6,240,510 B1 | 5/2001 | Yeh et al. |
| 6,243,804 B1 | 6/2001 | Cheng |
| 6,247,113 B1 | 6/2001 | Jaggar |
| 6,253,338 B1 | 6/2001 | Smolders |
| 6,256,771 B1 | 7/2001 | O'Neil et al. |
| 6,256,775 B1 | 7/2001 | Flynn |
| 6,275,893 B1 | 8/2001 | Bonola |
| 6,278,064 B1 | 8/2001 | Hinkley et al. |
| 6,285,974 B1 | 9/2001 | Mandyam et al. |
| 6,286,132 B1 | 9/2001 | Tanaka et al. |
| 6,286,584 B1 | 9/2001 | Frields |
| 6,298,521 B1 | 10/2001 | Butterfield |
| 6,311,327 B1 | 10/2001 | O'Brien et al. |
| 6,324,689 B1 | 11/2001 | Lowney et al. |
| 6,330,662 B1 | 12/2001 | Patel et al. |
| 6,339,818 B1 | 1/2002 | Olszewski et al. |
| 6,349,406 B1 | 2/2002 | Levine et al. |
| 6,351,844 B1 | 2/2002 | Bala |
| 6,353,877 B1 | 3/2002 | Duncan et al. |
| 6,374,364 B1 | 4/2002 | McElroy et al. |
| 6,378,064 B1 | 4/2002 | Edwards et al. |
| 6,381,679 B1 | 4/2002 | Matsubara et al. |
| 6,404,500 B1 | 6/2002 | Schneider et al. |
| 6,406,135 B1 | 6/2002 | Watanabe et al. |
| 6,408,386 B1 | 6/2002 | Hammond et al. |
| 6,425,118 B1 | 7/2002 | Molloy et al. |
| 6,430,741 B1 | 8/2002 | Mattson, Jr. et al. |
| 6,430,938 B1 | 8/2002 | Royal et al. |
| 6,438,743 B1 | 8/2002 | Boehm et al. |
| 6,442,585 B1 | 8/2002 | Dean et al. |
| 6,446,019 B1 | 9/2002 | Kynett et al. |
| 6,446,029 B1 | 9/2002 | Davidson et al. |
| 6,453,468 B1 | 9/2002 | D'Souza |
| 6,457,170 B1 | 9/2002 | Boehm et al. |
| 6,459,998 B1 | 10/2002 | Hoffman |
| 6,460,135 B1 | 10/2002 | Suganuma |
| 6,460,693 B1 | 10/2002 | Harrold |
| 6,477,703 B1 | 11/2002 | Smith et al. |
| 6,480,938 B2 | 11/2002 | Vondran, Jr. |
| 6,480,966 B1 | 11/2002 | Rawson, III |
| 6,484,315 B1 | 11/2002 | Ziese |
| 6,501,995 B1 | 12/2002 | Kinney et al. |
| 6,505,292 B1 | 1/2003 | Witt |
| 6,513,045 B1 | 1/2003 | Casey et al. |
| 6,519,310 B2 | 2/2003 | Chapple |
| 6,526,571 B1 | 2/2003 | Aizikowitz et al. |
| 6,530,042 B1 | 3/2003 | Davidson et al. |
| 6,539,458 B2 | 3/2003 | Holmberg |
| 6,542,985 B1 | 4/2003 | Johnson et al. |
| 6,549,930 B1 | 4/2003 | Chrysos et al. |
| 6,549,959 B1 | 4/2003 | Yates et al. |
| 6,549,998 B1 | 4/2003 | Pekarich et al. |
| 6,550,002 B1 | 4/2003 | Davidson et al. |
| 6,560,693 B1 | 5/2003 | Puzak et al. |
| 6,562,858 B2 | 5/2003 | Oxenkrug |
| 6,569,679 B1 | 5/2003 | Barber et al. |
| 6,574,727 B1 | 6/2003 | Davidson et al. |
| 6,594,820 B1 | 7/2003 | Ungar |
| 6,598,153 B1 | 7/2003 | Flachs et al. |
| 6,601,233 B1 | 7/2003 | Underwood |
| 6,631,514 B1 | 10/2003 | Le |
| 6,636,950 B1 | 10/2003 | Mithal et al. |
| 6,647,301 B1 | 11/2003 | Sederlund et al. |
| 6,654,781 B1 | 11/2003 | Browning |
| 6,658,416 B1 | 12/2003 | Hussain et al. |
| 6,658,651 B2 | 12/2003 | O'Brien et al. |
| 6,662,295 B2 | 12/2003 | Yamaura |
| 6,665,776 B2 | 12/2003 | Jouppi et al. |
| 6,678,755 B1 | 1/2004 | Peterson et al. |
| 6,681,387 B1 | 1/2004 | Hwu et al. |
| 6,681,388 B1 | 1/2004 | Sato et al. |
| 6,687,794 B2 | 2/2004 | Malik |
| 6,687,807 B1 | 2/2004 | Damron |
| 6,687,811 B1 | 2/2004 | Yamada |
| 6,708,296 B1 | 3/2004 | Gover et al. |
| 6,721,875 B1 | 4/2004 | McCormick, Jr. et al. |
| 6,725,457 B1 | 4/2004 | Priem et al. |
| 6,725,458 B2 | 4/2004 | Shimotani et al. |
| 6,732,354 B2 | 5/2004 | Ebeling et al. |
| 6,735,666 B1 | 5/2004 | Koning |
| 6,735,757 B1 | 5/2004 | Kroening et al. |
| 6,742,179 B2 | 5/2004 | Megiddo et al. |
| 6,757,771 B2 | 6/2004 | Christie |
| 6,758,168 B2 | 7/2004 | Koskinen et al. |
| 6,772,322 B1 * | 8/2004 | Merchant et al. ............ 712/227 |
| 6,772,412 B2 | 8/2004 | Baba et al. |
| 6,774,724 B2 | 8/2004 | Krvavac |
| 6,775,728 B2 | 8/2004 | Zimmer et al. |
| 6,775,825 B1 | 8/2004 | Grumann et al. |
| 6,782,454 B1 | 8/2004 | Damron |
| 6,785,844 B2 | 8/2004 | Wong et al. |
| 6,801,961 B2 | 10/2004 | Chu et al. |
| 6,820,155 B1 | 11/2004 | Ito |
| 6,832,296 B2 | 12/2004 | Hooker |
| 6,840,829 B2 | 1/2005 | Matsuda et al. |
| 6,842,850 B2 | 1/2005 | Ganapathy et al. |
| 6,848,029 B2 | 1/2005 | Coldewey |
| 6,848,030 B2 | 1/2005 | Tokar et al. |
| 6,857,083 B2 | 2/2005 | Floyd et al. |
| 6,865,663 B2 | 3/2005 | Barry |
| 6,865,666 B2 | 3/2005 | Yoshida et al. |
| 6,871,298 B2 | 3/2005 | Cavanaugh et al. |
| 6,918,106 B1 | 7/2005 | Burridge et al. |
| 6,918,606 B2 | 7/2005 | Petrishe |
| 6,925,424 B2 | 8/2005 | Jones et al. |
| 6,928,521 B1 | 8/2005 | Burton et al. |
| 6,928,582 B2 | 8/2005 | Adl-Tabatabai et al. |
| 6,930,508 B2 | 8/2005 | Kim et al. |
| 6,944,720 B2 | 9/2005 | Sperber et al. |
| 6,944,722 B2 | 9/2005 | Cantrill |
| 6,944,734 B2 | 9/2005 | Anzai et al. |
| 6,948,032 B2 | 9/2005 | Kadambi et al. |
| 6,948,059 B1 | 9/2005 | Sprecher et al. |
| 6,951,018 B2 | 9/2005 | Long et al. |
| 6,961,681 B1 | 11/2005 | Choquier et al. |
| 6,961,925 B2 | 11/2005 | Callahan, II et al. |
| 6,966,057 B2 | 11/2005 | Lueh |
| 6,970,999 B2 | 11/2005 | Kurihara et al. |
| 6,971,091 B1 | 11/2005 | Arnold et al. |
| 6,972,417 B2 | 12/2005 | Suganuma et al. |
| 6,972,541 B2 | 12/2005 | Matsushiro et al. |
| 6,973,417 B1 | 12/2005 | Maxwell et al. |
| 6,973,542 B1 | 12/2005 | Schmuck et al. |
| 6,981,128 B2 | 12/2005 | Fluhr et al. |
| 6,988,186 B2 | 1/2006 | Eickemeyer et al. |
| 7,020,808 B2 | 3/2006 | Sato et al. |
| 7,024,668 B2 | 4/2006 | Shiomi et al. |
| 7,035,996 B2 | 4/2006 | Woodall et al. |
| 7,065,634 B2 | 6/2006 | Lewis et al. |
| 7,069,541 B2 | 6/2006 | Dougherty et al. |
| 7,082,486 B2 * | 7/2006 | DeWitt et al. ................ 710/260 |
| 7,086,035 B1 * | 8/2006 | Mericas ....................... 717/127 |
| 7,089,535 B2 | 8/2006 | Bates et al. |
| 7,093,081 B2 | 8/2006 | DeWitt, Jr. et al. |
| 7,093,154 B2 | 8/2006 | Bartfai et al. |
| 7,093,236 B2 | 8/2006 | Swaine et al. |
| 7,114,036 B2 | 9/2006 | DeWitt, Jr. et al. |
| 7,114,150 B2 | 9/2006 | Dimpsey et al. |
| 7,131,115 B2 | 10/2006 | Hundt et al. |
| 7,155,575 B2 | 12/2006 | Krishnaiyer et al. |
| 7,162,594 B2 | 1/2007 | Bungo |
| 7,168,067 B2 | 1/2007 | Betker et al. |
| 7,181,723 B2 | 2/2007 | Luk et al. |
| 7,194,732 B2 | 3/2007 | Fisher et al. |
| 7,197,586 B2 | 3/2007 | DeWitt, Jr. et al. |
| 7,207,043 B2 | 4/2007 | Blythe et al. |
| 7,210,126 B2 | 4/2007 | Ghobrial et al. |

(56) References Cited

U.S. PATENT DOCUMENTS

| | | | |
|---|---|---|---|
| 7,225,309 B2 | 5/2007 | DeWitt, Jr. et al. | |
| 7,237,242 B2 | 6/2007 | Blythe et al. | |
| 7,257,657 B2 | 8/2007 | DeWitt, Jr. et al. | |
| 7,290,254 B2 | 10/2007 | Comp et al. | |
| 7,293,164 B2 | 11/2007 | DeWitt, Jr. et al. | |
| 7,296,130 B2 | 11/2007 | Dimpsey et al. | |
| 7,296,259 B2 | 11/2007 | Betker et al. | |
| 7,299,319 B2 | 11/2007 | Dimpsey et al. | |
| 7,313,655 B2 | 12/2007 | Hsu | |
| 7,373,637 B2 | 5/2008 | DeWitt, Jr. et al. | |
| 7,392,370 B2 | 6/2008 | DeWitt, Jr. et al. | |
| 7,395,527 B2 | 7/2008 | DeWitt et al. | |
| 7,415,699 B2 | 8/2008 | Gouriou et al. | |
| 7,415,705 B2 | 8/2008 | DeWitt, Jr. et al. | |
| 7,421,681 B2 | 9/2008 | DeWitt, Jr. et al. | |
| 7,421,684 B2 | 9/2008 | Dimpsey et al. | |
| 7,448,025 B2 | 11/2008 | Kalafatis et al. | |
| 7,458,078 B2 | 11/2008 | DeWitt, Jr. et al. | |
| 7,469,407 B2 | 12/2008 | Burky et al. | |
| 7,480,899 B2 | 1/2009 | Dimpsey et al. | |
| 7,487,301 B2 | 2/2009 | Mutz et al. | |
| 7,496,908 B2 | 2/2009 | DeWitt, Jr. et al. | |
| 7,496,909 B2 | 2/2009 | Kuch et al. | |
| 7,526,616 B2 | 4/2009 | Dimpsey et al. | |
| 7,526,757 B2 | 4/2009 | Levine et al. | |
| 7,574,587 B2 | 8/2009 | DeWitt, Jr. et al. | |
| 7,577,951 B2 | 8/2009 | Partamian et al. | |
| 7,581,218 B2 | 8/2009 | Johnson | |
| 7,594,219 B2 | 9/2009 | Ramachandran et al. | |
| 7,620,777 B2 | 11/2009 | Dimpsey et al. | |
| 7,779,394 B2 | 8/2010 | Homing et al. | |
| 7,783,886 B2 | 8/2010 | Walmsley | |
| 7,895,382 B2 | 2/2011 | DeWitt, Jr. et al. | |
| 7,895,473 B2 | 2/2011 | Alexander, III et al. | |
| 7,902,986 B2 | 3/2011 | Takei | |
| 7,926,041 B2 | 4/2011 | Dimpsey et al. | |
| 7,937,685 B2 | 5/2011 | Weil et al. | |
| 7,937,691 B2 | 5/2011 | Dewitt, Jr. et al. | |
| 7,987,453 B2 | 7/2011 | Dewitt, Jr. et al. | |
| 8,042,102 B2 | 10/2011 | Dewitt, Jr. et al. | |
| 8,070,009 B2 | 12/2011 | McKenzie et al. | |
| 8,135,915 B2 | 3/2012 | Dimpsey et al. | |
| 8,141,099 B2 | 3/2012 | Dewitt, Jr. et al. | |
| 8,171,457 B2 | 5/2012 | Dimpsey et al. | |
| 8,191,049 B2 | 5/2012 | Levine et al. | |
| 8,255,880 B2 | 8/2012 | Dewitt, Jr. et al. | |
| 8,381,037 B2 | 2/2013 | Dewitt, Jr. et al. | |
| 2001/0014905 A1 | 8/2001 | Onodera | |
| 2001/0032305 A1 | 10/2001 | Barry | |
| 2002/0019976 A1 | 2/2002 | Patel et al. | |
| 2002/0073406 A1 | 6/2002 | Gove | |
| 2002/0124161 A1 | 9/2002 | Moyer et al. | |
| 2002/0124237 A1 | 9/2002 | Sprunt et al. | |
| 2002/0129309 A1 | 9/2002 | Floyd et al. | |
| 2002/0147965 A1 | 10/2002 | Swaine et al. | |
| 2002/0157086 A1 | 10/2002 | Lewis et al. | |
| 2002/0199179 A1 | 12/2002 | Lavery et al. | |
| 2003/0005422 A1 | 1/2003 | Kosche et al. | |
| 2003/0014741 A1 | 1/2003 | Megiddo et al. | |
| 2003/0040955 A1 | 2/2003 | Anaya et al. | |
| 2003/0041096 A1 | 2/2003 | Johnson | |
| 2003/0061471 A1 | 3/2003 | Matsuo | |
| 2003/0066055 A1 | 4/2003 | Spivey | |
| 2003/0101367 A1 | 5/2003 | Bartfai et al. | |
| 2003/0115580 A1 | 6/2003 | Arai et al. | |
| 2003/0126590 A1 | 7/2003 | Burrows et al. | |
| 2003/0131343 A1 | 7/2003 | French et al. | |
| 2003/0135719 A1 | 7/2003 | DeWitt, Jr. et al. | |
| 2003/0135720 A1 | 7/2003 | DeWitt, Jr. et al. | |
| 2003/0154463 A1 | 8/2003 | Betker et al. | |
| 2003/0191900 A1 | 10/2003 | Hooker | |
| 2003/0225917 A1 | 12/2003 | Partamian et al. | |
| 2004/0003381 A1 | 1/2004 | Suzuki et al. | |
| 2004/0006546 A1 | 1/2004 | Wedlake et al. | |
| 2004/0030870 A1 | 2/2004 | Buser | |
| 2004/0049712 A1 | 3/2004 | Betker et al. | |
| 2004/0128651 A1 | 7/2004 | Lau | |
| 2004/0153612 A1 | 8/2004 | Mutz et al. | |
| 2004/0194076 A1 | 9/2004 | Comp et al. | |
| 2004/0205302 A1 | 10/2004 | Cantrill | |
| 2004/0236993 A1* | 11/2004 | Adkisson et al. | 714/30 |
| 2004/0268316 A1 | 12/2004 | Fisher et al. | |
| 2005/0071515 A1 | 3/2005 | DeWitt, Jr. et al. | |
| 2005/0071516 A1 | 3/2005 | Levine et al. | |
| 2005/0071608 A1 | 3/2005 | DeWitt, Jr. et al. | |
| 2005/0071609 A1 | 3/2005 | Levine et al. | |
| 2005/0071610 A1 | 3/2005 | Levine et al. | |
| 2005/0071611 A1 | 3/2005 | DeWitt, Jr. et al. | |
| 2005/0071612 A1 | 3/2005 | DeWitt et al. | |
| 2005/0071816 A1 | 3/2005 | Levine et al. | |
| 2005/0071817 A1 | 3/2005 | DeWitt et al. | |
| 2005/0071821 A1 | 3/2005 | Levine et al. | |
| 2005/0071822 A1 | 3/2005 | DeWitt, Jr. et al. | |
| 2005/0081019 A1 | 4/2005 | DeWitt et al. | |
| 2005/0081107 A1 | 4/2005 | DeWitt et al. | |
| 2005/0091456 A1 | 4/2005 | Huck | |
| 2005/0102493 A1 | 5/2005 | DeWitt, Jr. et al. | |
| 2005/0108483 A1 | 5/2005 | Bungo | |
| 2005/0154811 A1 | 7/2005 | DeWitt, Jr. et al. | |
| 2005/0154812 A1 | 7/2005 | DeWitt, Jr. et al. | |
| 2005/0154813 A1 | 7/2005 | DeWitt, Jr. et al. | |
| 2005/0154838 A1 | 7/2005 | DeWitt, Jr. et al. | |
| 2005/0154839 A1 | 7/2005 | DeWitt, Jr. et al. | |
| 2005/0154867 A1 | 7/2005 | DeWitt, Jr. et al. | |
| 2005/0155018 A1 | 7/2005 | DeWitt, Jr. et al. | |
| 2005/0155019 A1 | 7/2005 | Levine et al. | |
| 2005/0155020 A1 | 7/2005 | DeWitt, Jr. et al. | |
| 2005/0155021 A1 | 7/2005 | DeWitt, Jr. et al. | |
| 2005/0155022 A1 | 7/2005 | DeWitt, Jr. et al. | |
| 2005/0155025 A1 | 7/2005 | DeWitt, Jr. et al. | |
| 2005/0155026 A1 | 7/2005 | DeWitt, Jr. et al. | |
| 2005/0155030 A1 | 7/2005 | DeWitt, Jr. et al. | |
| 2005/0177822 A1 | 8/2005 | Kuch et al. | |
| 2005/0210275 A1 | 9/2005 | Homing et al. | |
| 2005/0210450 A1 | 9/2005 | Dimpsey et al. | |
| 2005/0257092 A1 | 11/2005 | Alexander et al. | |
| 2006/0090063 A1 | 4/2006 | Theis | |
| 2008/0088609 A1 | 4/2008 | Chou et al. | |
| 2008/0235495 A1 | 9/2008 | DeWitt et al. | |
| 2009/0287729 A1 | 11/2009 | Chen et al. | |
| 2009/0300587 A1 | 12/2009 | Zheng et al. | |
| 2011/0105970 A1 | 5/2011 | Gainer, Jr. | |
| 2011/0106994 A1 | 5/2011 | Dewitt, Jr. et al. | |
| 2012/0151465 A1 | 6/2012 | Dewitt, Jr. et al. | |

FOREIGN PATENT DOCUMENTS

| | | |
|---|---|---|
| JP | 10260820 | 9/1998 |
| JP | 2000029731 | 12/1999 |
| JP | 2000347863 | 12/2000 |
| TW | 406239 | 9/2000 |
| TW | 457432 | 10/2001 |
| TW | 457432 B | 10/2001 |

OTHER PUBLICATIONS

Office Action regarding U.S. Appl. No. 10/675,777, dated Oct. 2, 2006.

Response to Office Action regarding U.S. Appl. No. 10/675,777, dated Jan. 3, 2007.

Final Office Action regarding U.S. Appl. No. 10/675,777, dated Mar. 21, 2007.

Request for Continued Examination with Preliminary Amendment regarding U.S. Appl. No. 10/675,777, dated Jun. 20, 2007.

Notice of Allowance regarding U.S. Appl. No. 10/675,777, dated Sep. 25, 2007.

Supplemental Notice of Allowability regarding U.S. Appl. No. 10/675,777, dated Jan. 9, 2008.

Supplemental Notice of Allowability regarding U.S. Appl. No. 10/675,777, dated May 8, 2008.

Taiwan Search Report for application 094100082 dated Apr. 19, 2010.

(56) References Cited

OTHER PUBLICATIONS

Jya, "Software Design of a UNIX-like Kernel", Jul. 2003, pp. 1-4 http://etd.lib.nsysu.edu.tw/ETD-search-c/view_etd?URN+etd-09151030113427.
Ramirez et al., "The Effect of Code Reordering on Branch Prediction", Proceedings of the International Conference on Parallel Architectures and Compilation Techniques, Oct. 2000, pp. 189-198.
Yang et al., "Improving Performance by Branch Reordering", Proceedings of the ACM SIGPLAN 1998 Conference onProgramming Language Design and Implementation, Montreal Canada, 1008, pp. 130-141.
Conte et al., "Accurate and Practical Profile-Driven Compilation Using the Profile Buffer", Proceedings of the 29th Annual ACM/IEEE International Symposium on Microarchitecture, Paris, France, 1996, pp. 36-45.
Conte et al., "Using Branch Handling Hardware to Support Profile-Driven Optimization", Proceedings of the 27th Annual International Symposium on Microarchitecture, San Jose CA, 1994, pp. 12-21.
Fisher, "Trace Scheduling: A Technique for Global Microcode Compaction", IEEE Transactions on Computers, vol. C30, No. 7, Jul. 1981, pp. 478-490.
Chang et al., "Using Profile Information to Assist Classic Code Optimizations", Software Pract. Exper. 21, Dec. 1991, pp. 1301-1321.
Schmidt et al., "Profile-Directed Restructuring of Operating System Code", IBM Systems Journal, 1998, vol. 37, No. 2, pp. 270-297.
Aho et al., "Compilers: Principles, Techniques, and Tools", Addison-Wesley, 1988, pp. 488-497.
Intel, "Intel IA-64 Architecture Software Developer's Manual", Revision 1.1, vol. 4, No. 245320.002, Jul. 2001.
"CPU Cache", Wikipedia, pp. 1-14 retrieved Nov. 1, 2006 http://en.wikip;edia.org/wiki/CPU_cache.
Ammons et al., "Exploiting Hardware Performance Counters with Flow and Context Sensitive Profiling", 1997, ACM, pp. 85-96.
"Method for the dynamic prediction of nonsequential memory accesses", Sep. 25, 2002, pp. 1-4, ip.com IPCOM000009888D.
"Cache Miss Director—A Means of Prefetching Cache Missed Lines", Aug. 1, 1982, IBM Technical Disclosure Bulletin, vol. 25, Issue 3A, pp. 1286.
Kikuchi, "Parallelization Assist System", Joho Shori, vol. 34, No. 9, Sep. 1993, pp. 1158-1169.
Cohen et al., "Hardware-Assisted Characterization of NAS Benchmarks", Cluster Computing, vol. 4, No. 3, Jul. 2001, pp. 189-196.
Talla et al., "Evaluating Signal Processing and Multimedia Applications on SIMD, VLIW and Super Scalar Architectures", International Conference on Computer Design, Austin, Sep. 17-20, 2000, pp. 163-172.
Iwasawa et al., "Parallelization Method of Fortran DO Loops by Parallelizing Assist System", Transactions of Information Processings Society of Japan, vol. 36, No. 8, Aug. 1995, pp. 1995-2006.
Talla et al., "Execution Characteristics of Multimedia Applications on a Pentium II Processor", IEEE International Performance, Computing, and Communications Conference, 19th, Phoenix, Feb. 20-22, 2000, pp. 516-524.
IBM Research Disclosure Bulletin 444188, "Enable Debuggers as an Objective Performance Measurement Tool for Software Development Cost Reduction", Apr. 2001, pp. 686-688.
Jeong et al., "Cost Sensitive Cache Replacement Algorithms", Jun. 2002, Second Workshop on Cashing, Coherence and Consistency, NY, pp. 1-14.
Wikipedia "JavaServer Pages" downloaded Jan. 24, 2006 http://en.wikipedia.org/wiki/JavaServer_Pages.
"Hardware Cycle Based memory Residency", IBM, May 22, 2003, ip.com, IPCOM000012728D, pp. 1-2.
Hyde, "The Art of Assembly Language", 2001, Linux Edition, pp. 247-248, retrieved Mar. 1, 2005 from http://webster.cs.ucr.edu/AoA/Linux/PDFs/0_PDFIndexLinux.html.
Tanenbaum, "Structured Computer Organization", 1984, Prentice-Hall, Inc., 2nd Edition, pp. 10-12.
Torrellas et al., "False Sharing and Spatial Locality in Multiprocessor Caches", Jun. 1994, IEEE Transactions on Computers, vol. 43, No. 6, pp. 651-663.
Rothman et al., "Analysis of Shared Memory Misses and Reference Patterns", 2000, IEEE, pp. 187-198.
Short, "Embedded Microprocessor Systems Design: An Introduction Using the Intel 80C188EB" Prentice-Hall, Inc.: 1998, p. 761.
Mano, "Computer System Architecture", Prentice-Hall, Inc., $2^{nd}$ Ed., 1982, pp. 434-443.
Inoue, "Digital mobile communication system designed for nationwide police activities—WIDE system", IEEEXplore, Oct. 1996, pp. 1-2.
Merten et al., "A Hardware Driven Profiling Scheme for Identifying Program Hot Spots to Support Runtime Optimization", IEEE, 1999, pp. 136-147.
Yang et al., "Improving Performance by Branch Reordering", Proceedings of the ACM SIGPLAN 1998 Conference on Programming Language Design and Implementation, Montreal Canada, 1998, pp. 130-141.
Conte et al., "Using Branch Handling Hardware to Support Profile-Driven Optimization", Proceeding of the 27th Annual International Symposium on Microarchitecture, San Jose CA, 1994, pp. 12-21.
Chang et al., "Using Profile Information to Assist Classic Code Optimization", Software Pract. Exper. 21, Dec. 1991, pp. 1301-1321.
USPTO notice of allowance dated Oct. 2, 2012 regarding U.S. Appl. No. 10/682,385, 30 pages.
Office Action, dated May 27, 2011, regarding USPTO U.S. Appl. No. 13/004,153, 23 pages.
Final Office Action, dated Oct. 20, 2011, regarding USPTO U.S. Appl. No. 13/004,153, 10 pages.
Office Action, dated Feb. 25, 2013, regarding USPTO U.S. Appl. No. 13/004,153, 45 pages.
USPTO Final Office Action dated Jul. 24, 2007 regarding U.S. Appl. No. 10/808,716, 19 pages.
USPTO Final Office Action dated Nov. 16, 2007 regarding U.S. Appl. No. 10/808,716, 10 pages.
USPTO Notice of Allowance dated Sep. 12, 2008 regarding U.S. Appl. No. 10/808,716, 19 pages.
USPTO Office Action dated Feb. 8, 2007 regarding U.S. Appl. No. 10/808,716, 37 pages.
USPTO Final Office Action dated Sep. 25, 2007 regarding U.S. Appl. No. 10/675,721, 16 pages.
USPTO Final Office Action dated Oct. 3, 2008 regarding U.S. Appl. No. 10/675,721, 8 pages.
USPTO Office Action dated Feb. 26, 2007 regarding U.S. Appl. No. 10/675,721, 40 pages.
USPTO Office Action dated Apr. 9, 2008 regarding U.S. Appl. No. 10/675,721, 8 pages.
USPTO Final Office Action dated May 31, 2006 regarding U.S. Appl. No. 10/675,751), 15 pages.
USPTO Office Action dated Jan. 30, 2006 regarding U.S. Appl. No. 10/675,751, 17 pages.
USPTO Final Office Action dated Jun. 15, 2010 regarding U.S. Appl. No. 10/675,776, 9 pages.
USPTO Final Office Action dated Jun. 17, 2008 regarding U.S. Appl. No. 10/675,776, 17 pages.
USPTO Final Office Action dated Jun. 30, 2009 regarding U.S. Appl. No. 10/675,776, 22 pages.
USPTO Notice of Allowance dated Dec. 29, 2010 regarding U.S. Appl. No. 10/675,776, 10 pages.
USPTO Office Action dated Jan. 21, 2010 regarding U.S. Appl. No. 10/675,776, 13 pages.
USPTO Office Action dated Dec. 18, 2008 regarding U.S. Appl. No. 10/675,776, 22 pages.
USPTO Office Action dated Dec. 21, 2007 regarding U.S. Appl. No. 10/675,776, 17 pages.
USPTO Office Action dated Oct. 2, 2006 regarding U.S. Appl. No. 10/675,777, 25 pages.
USPTO Final Office Action dated May 31, 2006 regarding U.S. Appl. No. 10/675,778, 19 pages.
USPTO Office Action dated Feb. 3, 2006 regarding U.S. Appl. No. 10/675,778, 19 pages.

(56) References Cited

OTHER PUBLICATIONS

USPTO Final Office Action dated Oct. 26, 2007 regarding U.S. Appl. No. 10/675,783, 14 pages.
USPTO Final Office Action dated Oct. 30, 2008 regarding U.S. Appl. No. 10/675,783, 22 pages.
USPTO Office Action dated Apr. 17, 2008 regarding U.S. Appl. No. 10/675,783, 16 pages.
USPTO Office Action dated May 14, 2007 regarding U.S. Appl. No. 10/675,783, 42 pages.
USPTO Final Office Action dated Jun. 12, 2006 regarding U.S. Appl. No. 10/675,831, 18 pages.
USPTO Office Action dated Jan. 27, 2006 regarding U.S. Appl. No. 10/675,831, 17 pages.
USPTO Final Office Action dated Feb. 11, 2008 regarding U.S. Appl. No. 10/806,866, 17 pages.
USPTO Final Office Action dated Mar. 29, 2007 regarding U.S. Appl. No. 10/806,866, 22 pages.
USPTO Office Action dated Oct. 5, 2006 regarding U.S. Appl. No. 10/806,866, 32 pages.
USPTO Office Action dated Jum. 25, 2008 regarding U.S. Appl. No. 10/806,866, 6 pages.
USPTO Office Action dated Aug. 24, 2007 regarding U.S. Appl. No. 10/806,866, 23 pages.
USPTO Notice of Allowance dated Dec. 16, 2008 regarding U.S. Appl. No. 10/806,866, 8 pages.
USPTO Examiner's Answer to Appeal Brief dated Oct. 31, 2008 regarding U.S. Appl. No. 10/806,871, 21 pages.
USPTO Final Office Action dated Mar. 22, 2007 regarding U.S. Appl. No. 10/806,871, 23 pages.
USPTO Final Office Action dated Apr. 19, 2008 regarding U.S. Appl. No. 10/806,871, 20 pages.
USPTO Office Action dated Aug. 24, 2007 regarding U.S. Appl. No. 10/806,871, 26 pages.
USPTO Office Action dated Sep. 19, 2006 regarding U.S. Appl. No. 10/806,871, 35 pages.
USPTO Notice of Allowance dated Sep. 7, 2011 regarding U.S. Appl. No. 10/806,871, 9 pages.
USPTO Final Office Action dated Nov. 3, 2006 regarding U.S. Appl. No. 10/675,872, 19 pages.
USPTO Notice of Allowance dated Nov. 2, 2008 regarding U.S. Appl. No. 10/675,872, 6 pages.
USPTO Supplemental Notice of Allowance dated Mar. 19, 2008 regarding U.S. Appl. No. 10/675,872, 6 pages.
USPTO Office Action dated Jun. 5, 2006 regarding U.S. Appl. No. 10/675,872, 16 pages.
USPTO Office Action dated Jul. 13, 2007 regarding U.S. Appl. No. 10/675,872, 22 pages.
USPTO Final Office Action dated Oct. 4, 2007 regarding U.S. Appl. No. 10/806,917, 18 pages.
USPTO Notice of Allowance dated May 1, 2008 regarding U.S. Appl. No. 10/806,917, 9 pages.
USPTO Office Action dated Apr. 20, 2007 regarding U.S. Appl. No. 10/806,917, 45 pages.
Armand et al., "Multi-threaded Processes in Chorus/MIX," Proceedings of EEUG Spring 1990 Conference, Apr. 1990, pp. 1-16.
Briggs et al., "Synchronization, Coherence, and Event Ordering in Multiprocessors," Computer, vol. 21, Issue 2, Feb. 1988, pp. 9-21.
Cai, "Architectural and Multiprocessor Design Verification of the PowerPC 604 Data Cache," Conference Proceedings of the 1995 IEEE Fourteenth Annual International Phoenix Conference on Computers and Communications, Mar. 1995, pp. 383-388.
Carey et al., "The Architecture of the EXODUS Extensible DBMS", 1986 IEEE, ACM Digital Library, pp. 52-65.
Schulz, "EDG Testbed Experience," Oct. 2002, pp. 1-27, accessed Aug. 27, 2012 http://conferences.fnal.gov/lccws/papers2/tue/edgtestbmarkusfinal.pdf.
Grunwald et al., "Whole-Program Optimization for Time and Space Efficient Threads", ASPLOS-VII Proceedings—Seventh International Conference on Architectural Support for Programming Languages and Operating Systems, Oct. 1996, 10 pages.

"CPU cache," Wikipedia definition, article dated Oct. 2006, 14 pages, accessed Nov. 1, 2006 http://en.wikipedia.org/wiki/CPU_cache.
Kistler et al., "Continuous Program Optimization: A Case Study," ACM Transactions on Programming Languages and Systems, vol. 25, No. 4, Jul. 2003, pp. 500-548.
USPTO Final Office Action dated Aug. 15, 2007 regarding U.S. Appl. No. 10/682,437, 15 pages.
Santhanam et al., "Software Verification Tools Assessment Study", Department of Transportation: Federal Aviation Administration Technical Report, Report No. DOT/FAA/AR-06/54, Jun. 2007, 139 pages.
Schmidt et al., "Profile-directed restructuring of operating system code", IBM Systems Journal, vol. 37, No. 2, Apr. 1998, pp. 270-297.
Shye et al., "Code Coverage Testing Using Hardware Performance Monitoring Support", Proceedings of the Sixth International Symposium on Automated Analysis-Driven Debugging, Sep. 2005, 5 pages.
Soffa et al., "Exploiting Hardware Advances for Software Testing and Debugging (NIER Track)", Proceedings of the 33rd International Conference on Software Engineering, May 2011, 4 pages.
Stolicny et al., "Alpha 21164 Manufacturing Test Development and Coverage Analysis," IEEE Design & Test of Computers, vol. 15, Issue 3, Jul./Sep. 1988, pp. 98-104.
Talla et al., "Execution Characteristics of Multimedia Applications on a Pentium II Processor", Proceedings of the 19th IEEE International Performance, Computing, and Communications Conference, Feb. 2000, pp. 516-524.
"Interrupt," Wikipedia definition, article undated, last modified Aug. 8, 2012, 7 pages, accessed Aug. 27, 2012 http://en.wikipedia.org/wiki/Interrupt.
TW search report dated Jun. 30, 2010 regarding Taiwan application 094107739A, filed Mar. 14, 2005, 2 Pages.
Tran et al., "Student Paper: A hardware-Assisted Tool for Fast, Full Code Coverage Analysis," 19th International Symposium on Software Reliability Engineering, Nov. 2008, pp. 321,322.
Zhou, "Using Coverage Information to Guide Test Case Selection in Adaptive Random Testing," 2010 IEEE 34th Annual Computer Software and Applications Conference Workshops, Jul. 2010, pp. 208-213.
Saltz et al., "Run-Time Scheduling and Execution of Loops on Message Passing Machines," Journal of Parallel and Distributed Computing, vol. 8, Issue 4, April 990, pp. 303-312.
"Tool to Facilitate Testing of Software to Insur Compatibility," IBM Technical Disclosure Bulletin, vol. 30, Issue 11, Apr. 1988, pp. 162,165.
USPTO Office Action dated Aug. 24, 2007 regarding U.S. Appl. No. 10/757,171, 30 pages.
USPTO Notice of Allowance dated Jan. 14, 2008 regarding U.S. Appl. No. 10/757,171, 7 pages.
USPTO Final Office Action dated Mar. 12, 2007 regarding U.S. Appl. No. 10/757,186, 28 pages.
USPTO Final Office Action dated Nov. 29, 2007 regarding U.S. Appl. No. 10/757,186, 30 pages.
USPTO Notice of Allowance dated Oct. 20, 2010 regarding U.S. Appl. No. 10/757,186, 8 pages.
USPTO Office Action dated Aug. 1, 2007 regarding U.S. Appl. No. 10/757,186, 34 pages.
USPTO Office Action dated Nov. 28, 2005 regarding U.S. Appl. No. 10/757,186, 17 pages.
USPTO Final Office Action dated Jun. 16, 2006 regarding U.S. Appl. No. 10/757,192, 11 pages.
USPTO Notice of Allowance dated Nov. 3, 2006 regarding U.S. Appl. No. 10/757,192, 15 pages.
USPTO Office Action dated Dec. 8, 2005 regarding U.S. Appl. No. 10/757,192, 12 pages.
USPTO Final Office Action dated Jan. 30, 2008 regarding U.S. Appl. No. 10/757,197, 11 pages.
USPTO Final Office Action dated Mar. 12, 2007 regarding U.S. Appl. No. 10/757,197, 19 pages.
USPTO Notice of Allowance dated Oct. 15, 2008 regarding U.S. Appl. No. 10/757,197, 6 pages.
USPTO Office Action dated Aug. 17, 2007 regarding U.S. Appl. No. 10/757,197, 17 pages.

(56) References Cited

OTHER PUBLICATIONS

USPTO Office Action dated Sep. 13, 2006 regarding U.S. Appl. No. 10/757,197, 22 pages.
USPTO Office Action dated Mar. 14, 2006 regarding U.S. Appl. No. 10/757,198, 7 pages.
USPTO Office Action dated Dec. 2, 2005 regarding U.S. Appl. No. 10/757,198, 13 pages.
USPTO Notice of Allowance dated Jul. 28, 2006 regarding U.S. Appl. No. 10/757,227, 11 pages.
USPTO Supplemental Notice of Allowance dated Aug. 10, 2006 regarding U.S. Appl. No. 10/757,22, 4 pages.
USPTO Office Action dated Feb. 28, 2006 regarding U.S. Appl. No. 10/757,227, 13 pages.
USPTO Final Office Action dated May 8, 2006 regarding U.S. Appl. No. 10/687,248, 23 pages.
USPTO Office Action dated Jan. 6, 2006 regarding U.S. Appl. No. 10/687,248, 24 pages.
USPTO Final Office Action dated Jul. 5, 2007 regarding U.S. Appl. No. 10/757,250, 11 pages.
USPTO Notice of Allowance dated Nov. 20, 2007 regarding U.S. Appl. No. 10/757,250, 6 pages.
USPTO Office Action dated Oct. 6, 2006 regarding U.S. Appl. No. 10/757,250, 10 pages.
USPTO Notice of Allowance dated Dec. 27, 2011 regarding U.S. Appl. No. 12/185,254, 10 pages.
USPTO Notice of Allowance dated Jul. 1, 2009 regarding U.S. Appl. No. 12/431,389, 31 pages.
USPTO Notice of Allowance dated Apr. 30, 2008 regarding U.S. Appl. No. 10/757,250, 6 pages.
USPTO Office Action dated Feb. 26, 2007 regarding U.S. Appl. No. 10/682,437, 18 pages.
USPTO Office Action dated Jun. 15, 2011 regarding U.S. Appl. No. 12/122,558, 18 pages.
USPTO Notice of Allowance dated Nov. 22, 2011 regarding U.S. Appl. No. 12/122,558, 13 pages.
USPTO Final Office Action dated Oct. 24, 2006 regarding U.S. Appl. No. 10/806,576, 25 pages.
USPTO Office Action dated May 4, 2006 regarding U.S. Appl. No. 10/806,576, 16 pages.
USPTO Final Office Action dated May 9, 2006 regarding U.S. Appl. No. 10/674,604, 21 pages.
USPTO Office Action dated Jan. 17, 2006 regarding U.S. Appl. No. 10/674,604, 22 pages.
USPTO Final Office Action dated Jun. 23, 2006 regarding U.S. Appl. No. 10/674,606, 17 pages.
USPTO Office Action dated Jan. 12, 2006 regarding U.S. Appl. No. 10/674,606, 12 pages.
USPTO Final Office Action dated Dec. 20, 2006 regarding U.S. Appl. No. 10/806,633, 21 pages.
USPTO Notice of Allowance dated Apr. 20, 2007 regarding U.S. Appl. No. 10/806,633, 4 pages.
USPTO Supplemental Notice of Allowance dated Oct. 5, 2007 regarding U.S. Appl. No. 10/806,633, 7 pages.
USPTO Office Action dated May 15, 2006 regarding U.S. Appl. No. 10/806,633, 19 pages.
USPTO Final Office Action dated Aug. 23, 2007 regarding U.S. Appl. No. 10/674,642, 15 pages.
USPTO Office Action dated Feb. 27, 2007 regarding U.S. Appl. No. 10/674,642, 16 pages.
USPTO Office Action dated Mar. 27, 2008 regarding U.S. Appl. No. 10/674,642, 16 pages.
USPTO Office Action dated Aug. 24, 2006 regarding U.S. Appl. No. 10/674,642, 24 pages.
USPTO Notice of Allowance dated Mar. 18, 2011 regarding U.S. Appl. No. 10/803,663, 10 pages.
USPTO Office Action dated May 2, 2008 regarding U.S. Appl. No. 10/803,663, 23 pages.
USPTO Office Action dated May 4, 2007 regarding U.S. Appl. No. 10/803,663, 36 pages.
USPTO Office Action dated Oct. 18, 2007 regarding U.S. Appl. No. 10/803,663, 24 pages.
USPTO Final Office Action dated Apr. 29, 2008 regarding U.S. Appl. No. 10/808,716, 10 pages.
USPTO Notice of Allowance dated Aug. 15, 2013 regarding U.S. Appl. No. 13/004,153, 8 pages.
Supplemental notice of allowance dated Oct. 3, 2013 regarding U.S. Appl. No. 13/004,153, 30 pages.
Non-final office action dated Sep. 20, 2013 regarding U.S. Appl. No. 13/347,876, 89 pages.
USPTO Final Office Action dated Jun. 10, 2013 regarding U.S. Appl. No. 13/004,153, 7 pages.

\* cited by examiner

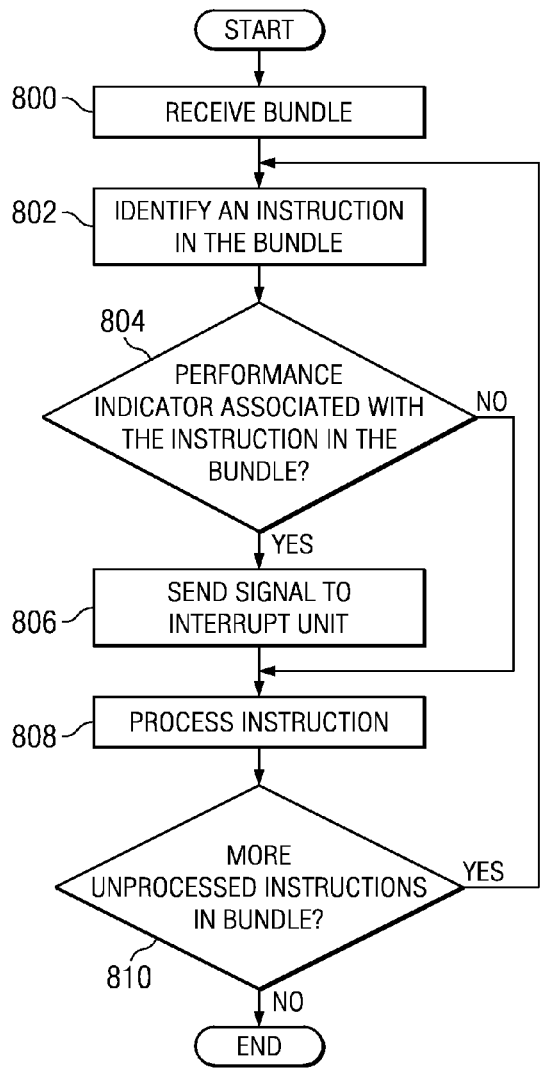
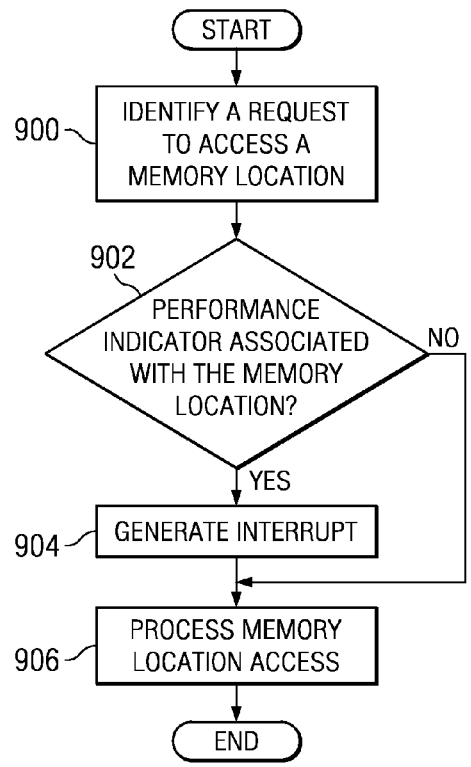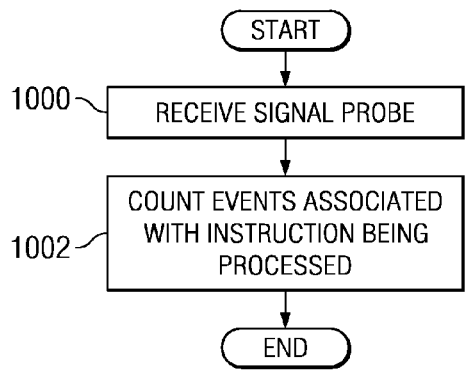

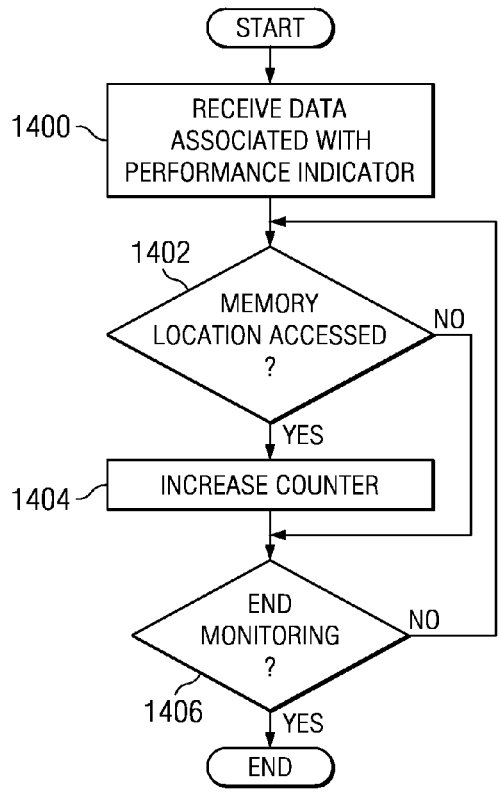
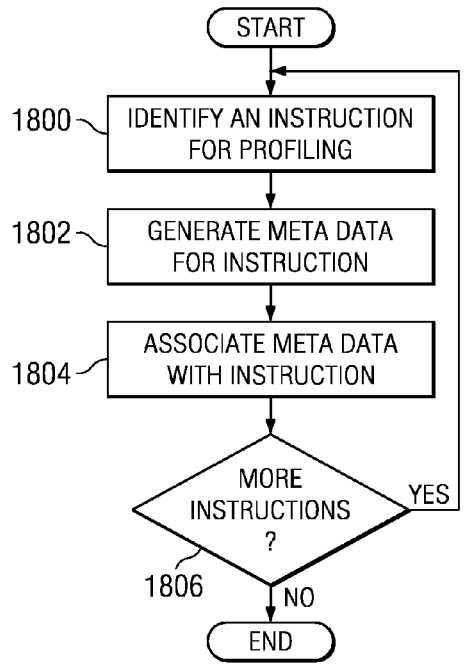
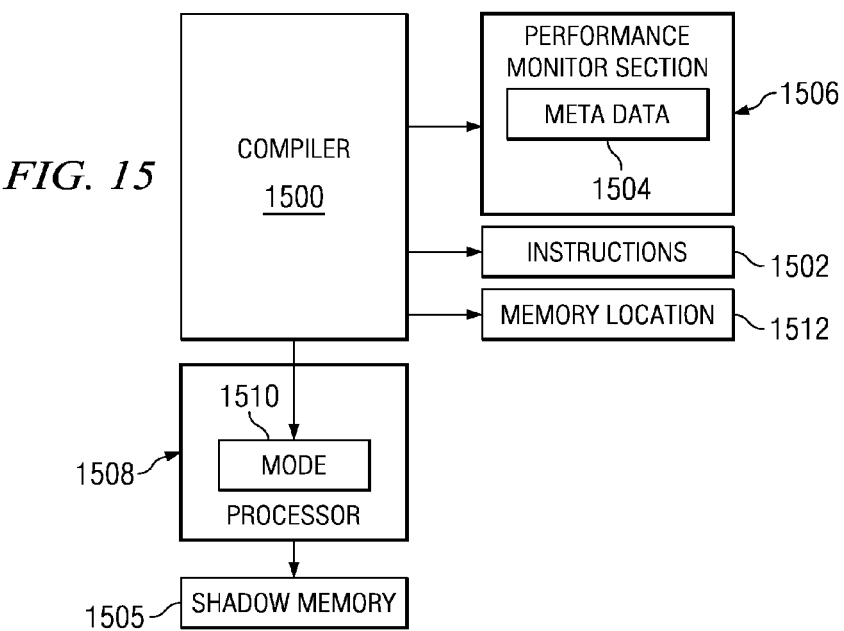

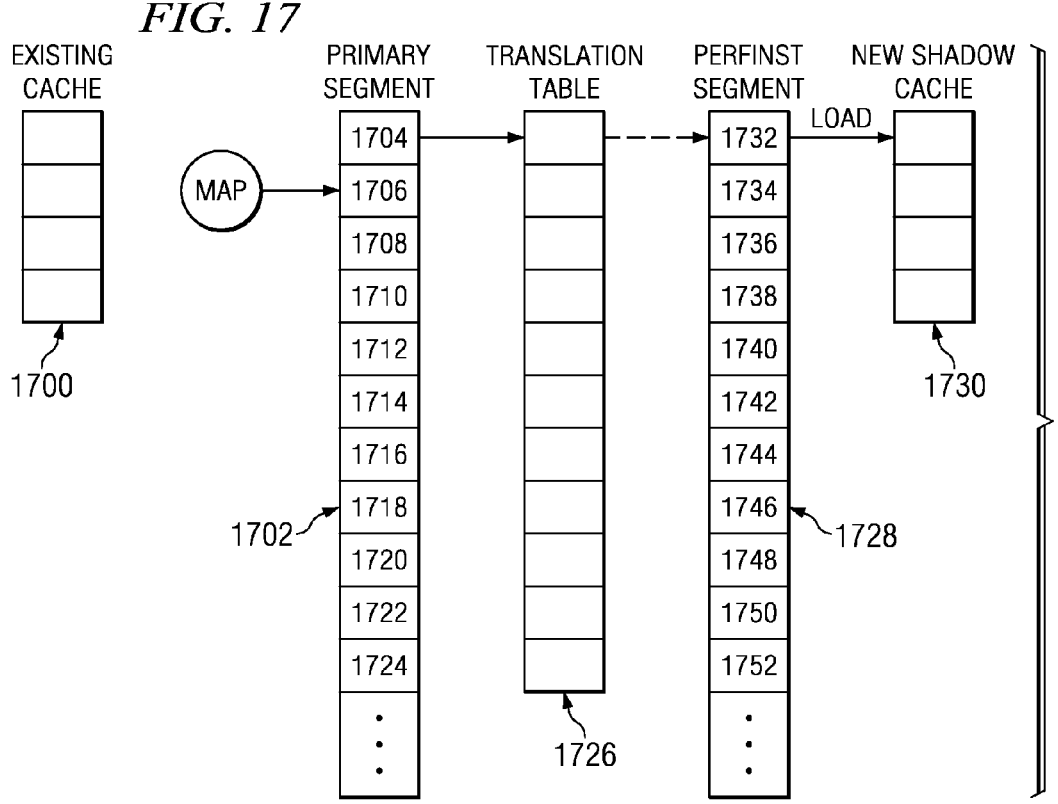

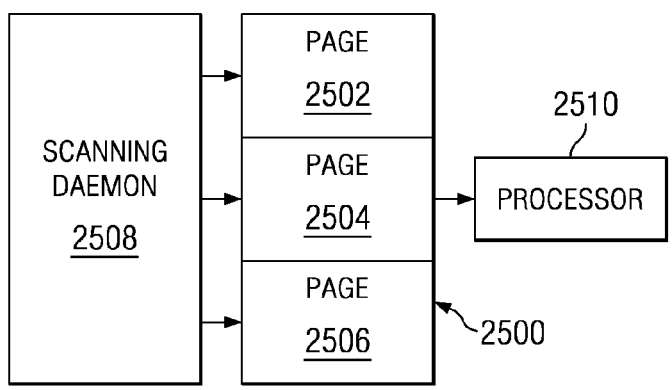
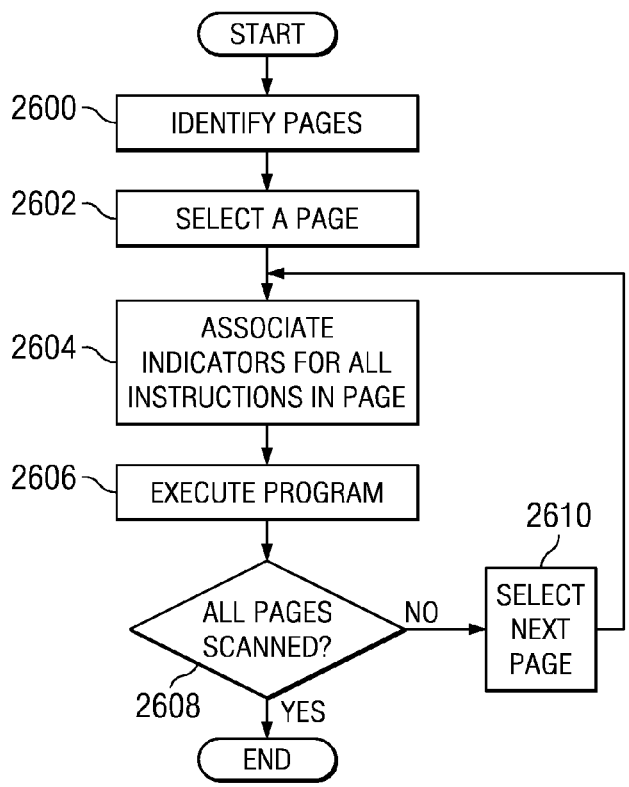
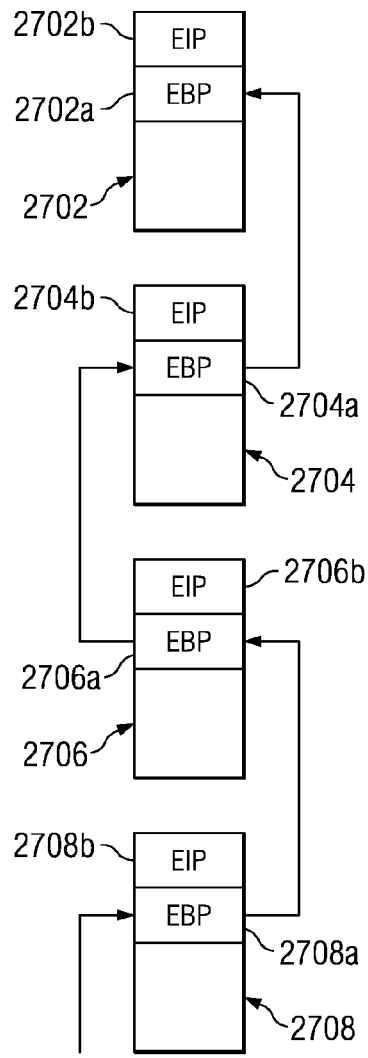

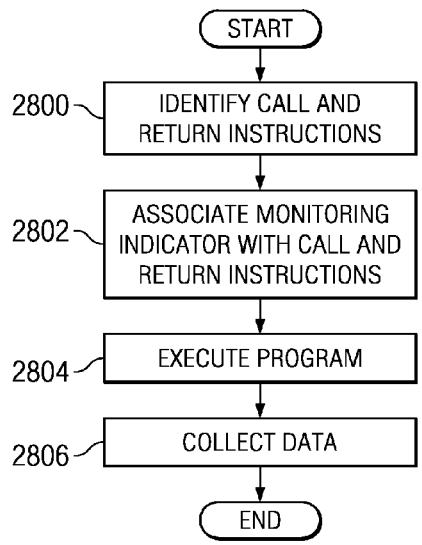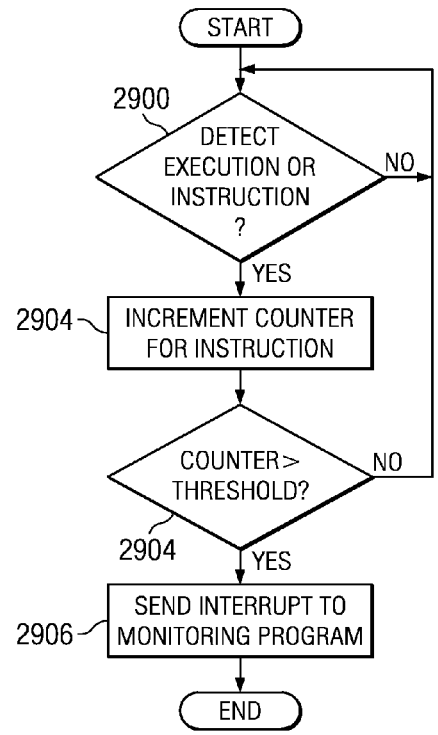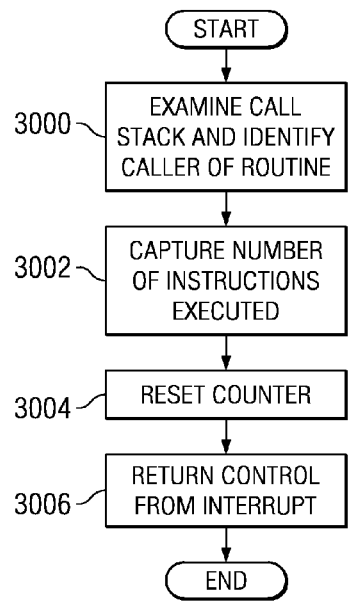

COUNTING INSTRUCTION EXECUTION AND DATA ACCESSES

This application is a continuation of application Ser. No. 10/675,777, filed Sep. 30, 2003 now U.S. Pat. No. 7,395,527.

CROSS REFERENCE TO RELATED APPLICATIONS

The present invention is related to the following applications entitled "Method and Apparatus for Selectively Counting Instructions and Data Accesses", Ser. No. 10/674,604, "Method and Apparatus for Generating Interrupts upon Execution of Marked Instructions and upon Access to Marked Memory Locations", Ser. No. 10,675,831, "Method and Apparatus for Counting Data Accesses and Instruction Executions that Exceed a Threshold", Ser. No. 10/675,778, "Method and Apparatus for Counting Execution of Specific Instructions and Accesses to Specific Data Locations", Ser. No. 10/675,776, "Method and Apparatus for Debug Support for Individual Instructions and Memory Locations", Ser. No. 10,675,751, "Method and Apparatus to Autonomically Select Instructions for Selective Counting", Ser. No. 10/675,721, "Method and Apparatus to Autonomically Count Instruction Execution for Applications", Ser. No. 10/674,642, "Method and Apparatus to Autonomically Take an Exception on Specified Instructions", Ser. No. 10/674,606, "Method and Apparatus to Autonomically Profile Applications", Ser. No. 10/675,783, and "Method and Apparatus for Counting Instruction and Memory Location Ranges", Ser. No. 10/675,872, filed Sep. 30, 2003, assigned to the same assignee, and incorporated herein by reference.

BACKGROUND OF THE INVENTION

1. Technical Field

The present invention relates generally to an improved data processing system. In particular, the present invention provides a method and apparatus for obtaining performance data in a data processing system. Still more particularly, the present invention provides a method and apparatus for hardware assistance to software tools in obtaining performance data in a data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur, a so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records, similar to entry-exit records, also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots". Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is an executable portion of the larger program being profiled, may be recorded during the intervals. These values may be resolved against a load map and symbol table information for the data processing system at post-processing time, and a profile of where the time is being spent may be obtained from this analysis.

Creating tools such as these to find answers related to specific situations or problems can take much effort and can be very difficult to calibrate as the software tools themselves affect the system under test. The present invention recognizes that hardware assistance for tool development and problem analysis can significantly ease the amount of effort needed to develop software performance tools. Further, with the increasing density of processors, hardware assistance can be included to provide additional debug and analysis features.

Therefore, it would be advantageous to have an improved method, apparatus, and computer instructions for providing hardware assistance for performance tools for analyzing the performance of data processing systems.

SUMMARY OF THE INVENTION

The present invention provides a method, apparatus, and computer instructions in a data processing system for processing instructions. Instructions are received at a processor in the data processing system. If a selected indicator is associated with the instruction, counting of each event associated with the execution of the instruction is enabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for selectively sending instructions to an interrupt unit in accordance with a preferred embodiment of the present invention;

FIG. 9 is a flowchart of a process for generating an interrupt in response to an access of a memory location associated with a performance indicator in accordance with a preferred embodiment of the present invention;

FIG. 10 is a flowchart of a process for counting events in accordance with a preferred embodiment of the present invention;

FIG. 14 is a flowchart of a process for accesses to a memory location in accordance with a preferred embodiment of the present invention;

FIG. 15 is a block diagram illustrating components used for generating meta data, such as performance indicators, in accordance with a preferred embodiment of the present invention;

FIG. 16 is a diagram illustrating meta data in accordance with a preferred embodiment of the present invention;

FIG. 17 is a diagram illustrating components involved in loading and maintaining a performance instrumentation shadow cache in accordance with a preferred embodiment of the present invention;

FIG. 18 is a flowchart of a process for generating meta data for instructions in accordance with a preferred embodiment of the present invention;

FIG. 25 is a diagram illustrating components used to scan pages through associating performance indicators with instructions in a page in accordance with a preferred embodiment of the present invention;

FIG. 26 is a flowchart of a process for associating indicators to instructions in a page in accordance with a preferred embodiment of the present invention;

FIG. 27 is a diagram depicting call stack containing stack frames in accordance with a preferred embodiment of the present invention;

FIG. 28 is a flowchart of a process for identifying events associated with call and return instructions in which data is collected from a performance monitor unit in accordance with a preferred embodiment of the present invention;

FIG. 29 is a flowchart of a process for identifying instructions that have been executed more than a selected number of times in accordance with a preferred embodiment of the present invention;

FIG. 30 is a flowchart of a process for examining a call stack and identifying a caller of a routine when a particular instruction is executed more than some selected number of times in accordance with a preferred embodiment of the present invention;

DETAILED DESCRIPTION OF THE PREFERRED EMBODIMENT

Figure 1:
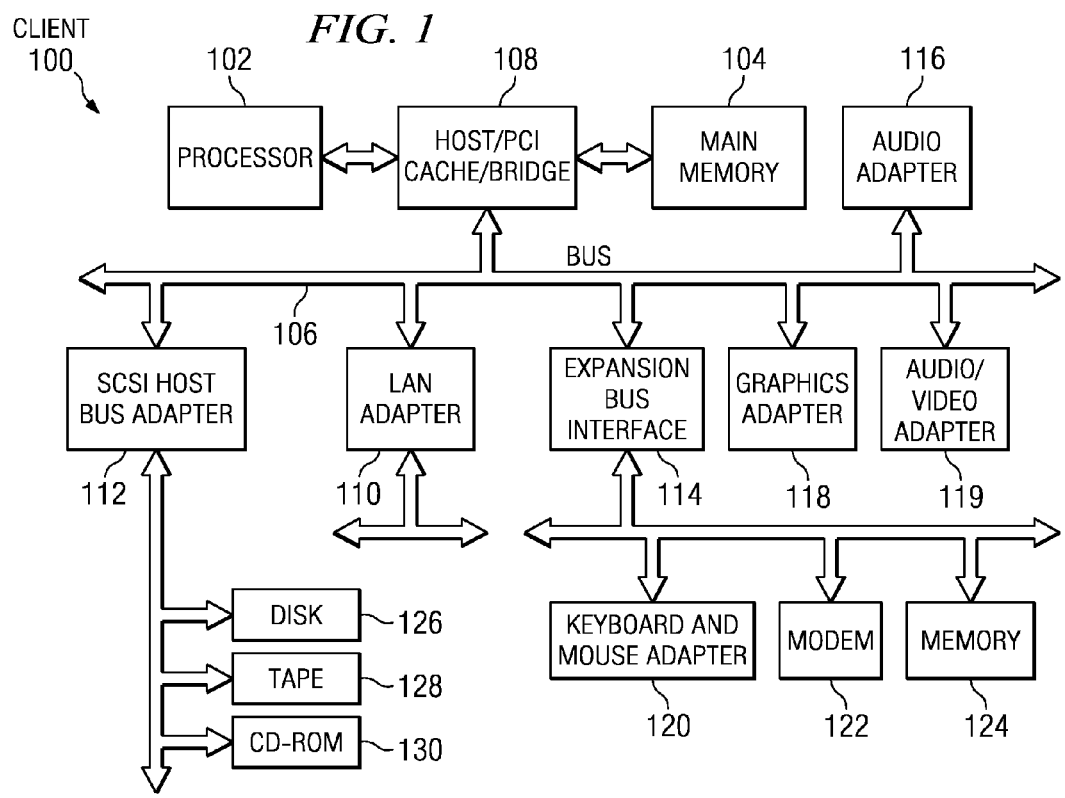
FIG. 1 is a block diagram of a data processing system in which the present invention may be implemented.

With reference now to FIG. 1, a block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
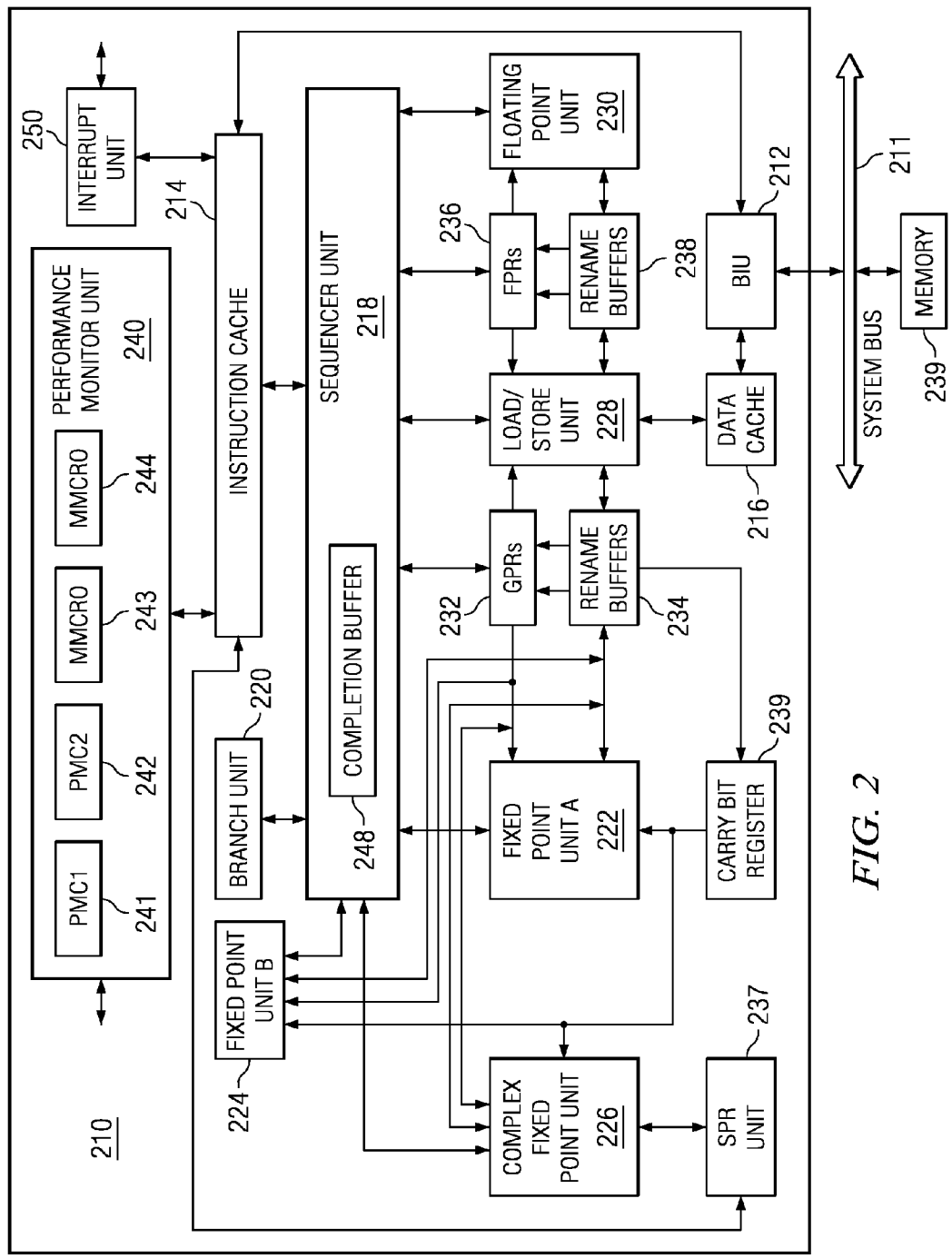
FIG. 2 is a block diagram of a processor system for processing information according to a preferred embodiment of the present invention.

Turning next to FIG. 2, a block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239.

FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 239 connected to system bus 211. Moreover, data cache 216 is able to output (through BIU 212 and system bus 211) information from data cache 216 to system memory 239 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 239 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing, CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The present invention provides an ability to monitor the execution of specific instructions as well as the access of specific memory locations during the execution of a program. Specifically, a spare field may be used to hold an indicator that identifies the instruction or memory location as one that is to be monitored by a performance monitor unit or by some other unit in a processor. Alternatively, the indicator may be stored in another location in association with the instruction or memory location. In the case in which the indicator is placed in the instruction, a spare field is typically used, but in some cases the instruction may be extended to include the space needed for the indicator. With this case, the architecture of the processor may require changes. For example, a 64 bit architecture may be changed to a 65 bit architecture to accommodate the indicator. With respect to accesses of data, an indicator may be associated with the data or memory locations in which the data is located.

Figure 3:
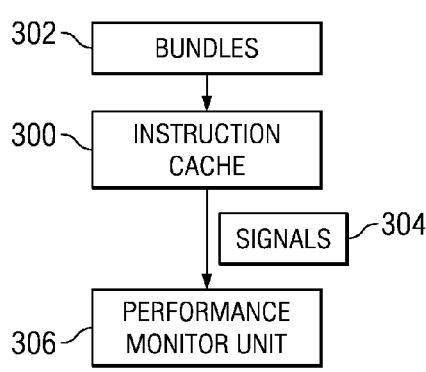
FIG. 3 is a diagram illustrating components used in processing instructions associated with indicators in accordance with a preferred embodiment of the present invention.

Turning now to FIG. 3, a diagram illustrating components used in processing instructions associated with indicators is depicted in accordance with a preferred embodiment of the present invention. Instruction cache 300 receives bundles 302. Instruction cache 300 is an example of instruction cache 214 in FIG. 2. A bundle is a grouping of instructions. This type of grouping of instructions is typically found in an IA-64 processor, which is available from Intel Corporation. Instruction cache 300 processes instructions for execution.

As part of this processing of instructions, instruction cache 300 determines which instructions are associated with indicators. These indicators also are referred to as "performance indicators" in these examples. Signals 304 have been associated with performance indicators. As a result, signals 304 for the instructions are sent to performance monitor unit 306. Performance monitor unit 306 is an example of performance monitor unit 240 in FIG. 2.

When instruction cache 300 determines that an instruction associated with an indicator is present, a signal is sent to indicate that a marked instruction is being executed. In these examples, a marked instruction is an instruction associated with a performance indicator. Alternatively, a performance indicator may indicate that all items or instructions in a bundle are marked to be counted. Additionally, signals for these instructions are sent by instruction cache 300 to the appropriate functional unit. Depending on the particular implementation, a functional unit other than performance monitor unit 306 may count execution of instructions. In the case that the performance indicators are in the instructions, or in the bundles, the cache unit, instruction cache 300, detects the indicators and sends signals to performance monitor unit 306.

When signals for these instructions are received by performance monitor unit 306, performance monitor unit 306 counts events associated with execution of instructions 304. As illustrated, performance monitor unit 306 is programmed only to count events for instructions associated with performance indicators. In other words, an indicator associated with a instruction or memory location is used to enable counting of events associated with the instruction or memory location by performance monitor unit 306. If an instruction is received by instruction cache 300 without a performance indicator, then events associated with that instruction are not counted. In summary, the performance indicators enable the counting on a per instruction or per memory location basis in a processor.

Performance monitor unit 306 counts events for instructions associated with performance indicators, if performance monitor unit 306 is set in a mode to count metrics enabled for these types of marked instructions. In some cases, performance monitor unit 306 may be set to perform some other type of counting, such as counting execution of all instructions, which is a currently available function.

With respect to the accessing of data in memory locations, the data and indicators are processed by a data cache, such as data cache 216 in FIG. 2, rather than by an instruction cache. The data cache sends signals indicating that marked memory locations are being accessed to performance monitor unit 306. Marked memory locations are similar to marked instructions. These types of memory locations are ones associated with a performance indicator.

Figure 4:
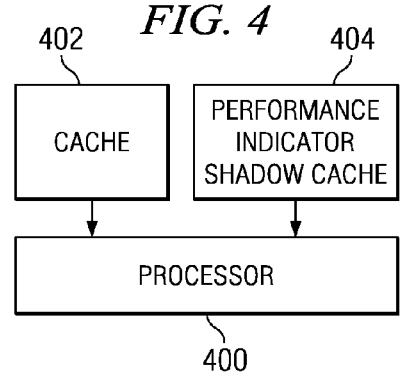
FIG. 4 is a diagram illustrating one mechanism for associating a performance indicator with an instruction or memory location in accordance with a preferred embodiment.

Turning next to FIG. 4, a diagram illustrating one mechanism for associating a performance indicator with an instruction or memory location is depicted in accordance with a preferred embodiment of the present invention. Processor 400 receives instructions from cache 402. In this example, the indicators are not stored with the instructions or in the memory locations in which data is found. Instead, the indicators are stored in a separate area of storage, performance instrumentation shadow cache 404. The storage may be any storage device, such as, for example, a system memory, a flash memory, a cache, or a disk.

When processor 400 receives an instruction from cache 402, processor 400 checks performance instrumentation shadow cache 404 to see whether a performance indicator is associated with the instruction. A similar check is made with respect to accesses of memory locations containing data. In one embodiment, a full shadow word is provided for each corresponding word that does not affect the actual data segments. In other words, processor 400 allows for the architecture or configuration of cache 402 to remain unchanged. In these examples, the mapping described is word for word. However, some other type of mapping may be used, such as a shadow bit per data word in which a bit in performance instrumentation shadow cache 404 corresponds to one word of data.

With respect to this type of architecture, the compilers, using this feature, create the debug information in a separate work area from the data area themselves in a manner similar to debug symbols. When a module is loaded, the extra information, performance indicators, is prepared by the loader so that it will be available to incorporate into performance instrumentation shadow cache 404 when instructions are loaded into cache 402. These cache areas may be intermingled and either marked as such or understood by the mode of operation. Processor 400 uses the performance indicators to determine how the related data accesses and instruction executions are to be counted or made to take exceptions. In these examples, the process is programmed by a debugger or a performance analysis program to know whether to use the shadow information while it is executing instructions.

Figure 5:
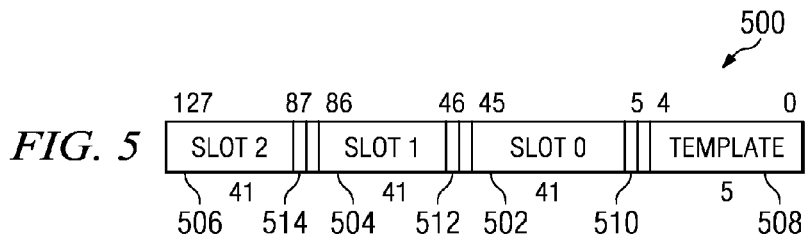
FIG. 5 is a diagram illustrating a bundle in accordance with a preferred embodiment of the present invention.

Turning next to FIG. 5, a diagram illustrating a bundle is depicted in accordance with a preferred embodiment of the present invention. Bundle 500 contains instruction slot 502, instruction slot 504, instruction slot 506 and template 508. As illustrated, bundle 500 contains 128 bits. Each instruction slot contains 41 bits, and template 508 contains 5 bits. Template 508 is used to identify stops within the current bundle and to map instructions within the slots to different types of execution units.

Spare bits within bundle 500 are used to hold indicators of the present invention. For example, indicators 510, 512, and 514 are located within instruction slots 502, 504, and 506, respectively. These indicators may take various forms and may take various sizes depending on the particular implementation. Indicators may use a single bit or may use multiple bits. A single bit may be used to indicate that events are to be counted in response to execution of that instruction. Multiple bits may be used to identify a threshold, such as a number of processor or clock cycles for instruction execution that may pass before events should be counted. Further, these bits may even be used as a counter for a particular instruction. A similar use of fields may be used for indicators that mark data or memory locations.

Alternatively, template 508 may be used to contain a bundle of related indicators, so that one bit is used to identify all of the instructions in a bundle. Also, the bundle itself could be extended to be 256 bits or some other number of bits to contain the extra information for the performance indicators.

Figure 6A:
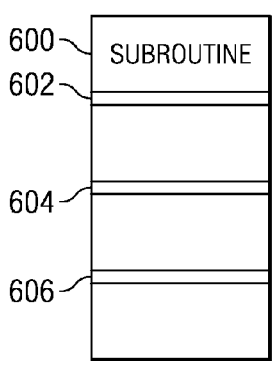
FIG. 6 is a diagram of a subroutine containing performance indicators in accordance with a preferred embodiment of the present invention.
Figure 6B:
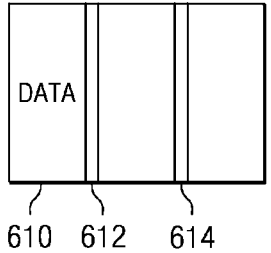

Turning next to FIGS. 6A and 6B, diagrams of a subroutine containing performance indicators and data containing performance indicators are depicted in accordance with a preferred embodiment of the present invention. In this example, subroutine 600 in FIG. 6A includes a number of instructions in which instructions 602, 604, and 606 are associated with performance indicators. These instructions also are referred to as marked instructions. When these instructions are executed, events associated with those instructions are counted to obtain data for software tools to analyze the performance of a data processing system executing a subroutine 600.

Data or memory locations containing data may be marked with indicators in a similar manner. These indicators are used in counting accesses to the data or memory locations in these examples. In FIG. 6B, data 610 includes data associated with performance indicators. Data 612 and data 614 are sections of data 610 that are associated with performance indicators. These sections of data, which are associated with performance indicators, also are referred to as marked data.

Figure 7:
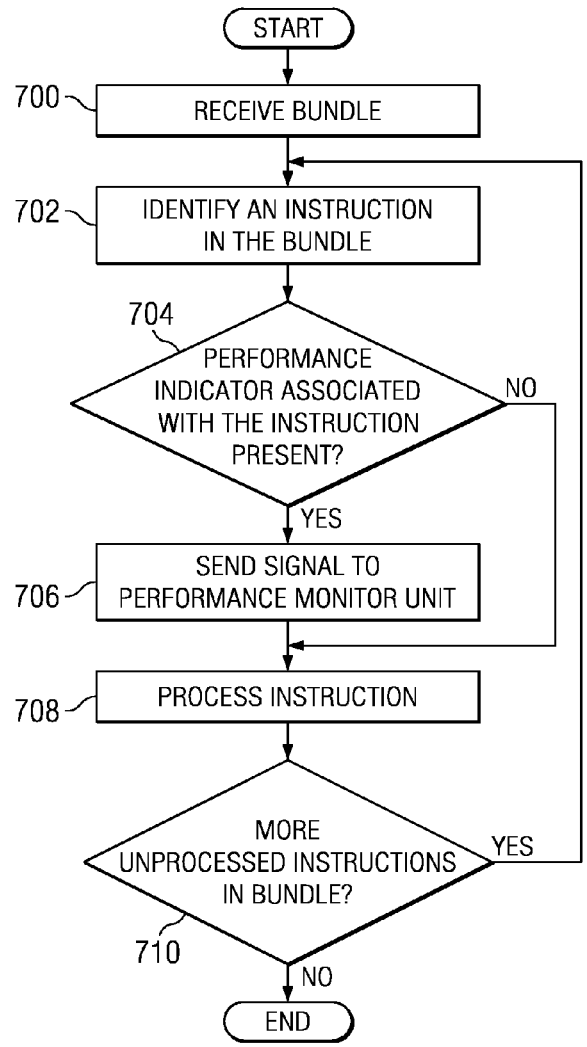
FIG. 7 is a flowchart of a process for processing instructions containing performance indicators in accordance with a preferred embodiment of the present invention.

Turning now to FIG. 7, a flowchart of a process for processing instructions containing performance indicators is depicted in accordance with a preferred embodiment of the present invention. The process illustrated in FIG. 7 may be implemented in an instruction cache, such as instruction cache 214 in FIG. 2.

The process begins by receiving a bundle (step 700). In these examples, each bundle has a format similar to bundle 500 in FIG. 5. An instruction in the bundle is identified (step 702). A determination is made as to whether a performance indicator associated with the instruction is present (step 704). This determination may be made by examining an appropriate field in the instruction or bundle. Alternatively, a performance instrumentation shadow cache, such as performance instrumentation shadow cache 404 in FIG. 4 may be checked to see if a performance indicator is associated with the instruction.

If a performance indicator is present, a signal is sent to a performance monitor unit (step 706). Upon receiving this signal, the performance monitor unit will count events associated with the execution of the instruction. Additionally, the instruction is processed (step 708). Processing of the instruction includes, for example, sending the instruction to the appropriate functional unit for execution.

Thereafter, a determination is made as to whether additional unprocessed instructions are present in the bundle (step 710). If additional unprocessed instructions are present in the bundle, the process returns to step 702 as described above. Otherwise, the process terminates. Turning back to step 704, if the performance indicator is not present, the process proceeds directly to step 708.

Turning now to FIG. 8 a flowchart of a process for selectively sending signals to an interrupt unit is depicted in accordance with a preferred embodiment of the present invention. The process illustrated in FIG. 8 may be implemented in an instruction cache, such as instruction cache 242 in FIG. 2. This process is employed in cases in which monitoring events using a performance monitor unit may miss certain events. For example, a performance monitor unit counts events. When a cache miss occurs, a signal is sent to the performance monitor unit. When the meta data for a corresponding cache line is loaded into the cache, the appropriate signal or signals also are raised. If the meta data indicates that an exception is to be raised, then a signal is sent to the interrupt unit in which the signal indicates that an exception is to be raised.

The process begins by receiving a bundle (step 800). An instruction in the bundle is identified (step 802). A determination is made as to whether a performance indicator associated with the instruction is present (step 804). The signal sent to the interrupt unit to indicate an exception is to be raised is different from the signal sent to the performance monitor unit. For example, an instruction may be associated with a specific performance indicator having a first value that causes a signal to be sent to the interrupt unit. A second value for a performance indicator may be used to send a different signal to the performance monitor unit. If a performance indicator having the first value is present, the signal is sent to an interrupt unit (step 806). Upon receiving this signal, the interrupt unit initiates appropriate call flow support to process this interrupt. The call flow support may, for example, record cache misses that may be missed by a functional unit trying to access instructions or data in a cache.

Additionally, the instruction is processed (step 808). Processing of the instruction includes, for example, sending the instruction to the appropriate functional unit for execution.

Thereafter, a determination is made as to whether additional unprocessed instructions are present in the bundle (step 810). If additional unprocessed instructions are present in the bundle, the process returns to step 802 as described above. Otherwise, the process terminates. Turning back to step 804, if the performance indicator is not present, the process proceeds directly to step 808.

With reference now to FIG. 9, a flowchart of a process for generating an interrupt in response to an access of a memory location associated with a performance indicator is depicted in accordance with a preferred embodiment of the present invention. The process illustrated in FIG. 9 may be implemented in a data cache, such as data cache 246 in FIG. 2.

The process begins by identifying a request to access a memory location (step 900). In response to identifying this request, a determination is made as to whether a performance indicator is associated with the memory location (step 902). If a performance indicator is associated with the memory location, an interrupt is generated by sending a signal to the interrupt unit (step 904). Thereafter, the access to the memory location is processed (step 906) with the process terminating thereafter.

In FIG. 10, a flowchart of a process for counting events is depicted in accordance with a preferred embodiment of the present invention. The process illustrated in FIG. 10 may be implemented in a performance monitor unit, such as performance monitor unit 240 in FIG. 2.

The process begins by receiving a signal from an instruction cache indicating that an instruction with a performance indicator is being processed (step 1000). Next, events associated with the instruction being processed are counted (step 1002) with the process terminating thereafter. The counting of events may be stored in a counter, such as counter 241 in FIG. 2.

Figure 11:
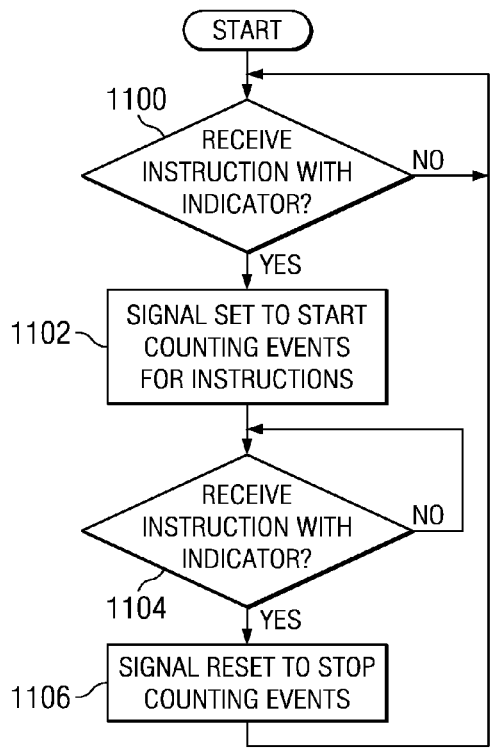
FIG. 11 is a flowchart of a process for selective counting of instructions in accordance with a preferred embodiment of the present invention.

With reference next to FIG. 11, a flowchart of a process for selective counting of instructions is depicted in accordance with a preferred embodiment of the present invention. The process illustrated in FIG. 11 may be implemented in an instruction cache, such as instruction cache 214 in FIG. 2.

The process begins by determining whether an instruction associated with a performance indicator has been received (step 1100). In this example, the indicator causes counting of events for this instruction and all subsequent instructions executed by the processor. Alternatively, the indicator could be an instruction itself which indicates the new mode of counting is to be started. If an instruction with an indicator has been received, a flag is set to start counting events for instructions (step 1102). This flag indicates that counting events for instructions should start.

Next, a determination is made as to whether an instruction with an indicator has been received (step 1104). Alternatively, the indicator could be an instruction itself which indicates the new mode of counting is to be stopped. If an instruction with an indicator is received, the flag is unset to stop counting the events (step 1106) with the process terminating thereafter.

The indicator in step 1100 and step 1104 may be the same indicator in which the indicator toggles the setting and unsetting of the flag. In another implementation, two different indicators may be used in which a first indicator only sets the flag. A second indicator is used to unset the flag. Communication between a cache unit, such as an instruction cache or a data cache, and the performance monitor unit to indicate a mode of counting may be implemented simply with a high signal when counting is to occur and a low signal when counting is no longer enabled.

Figure 12:
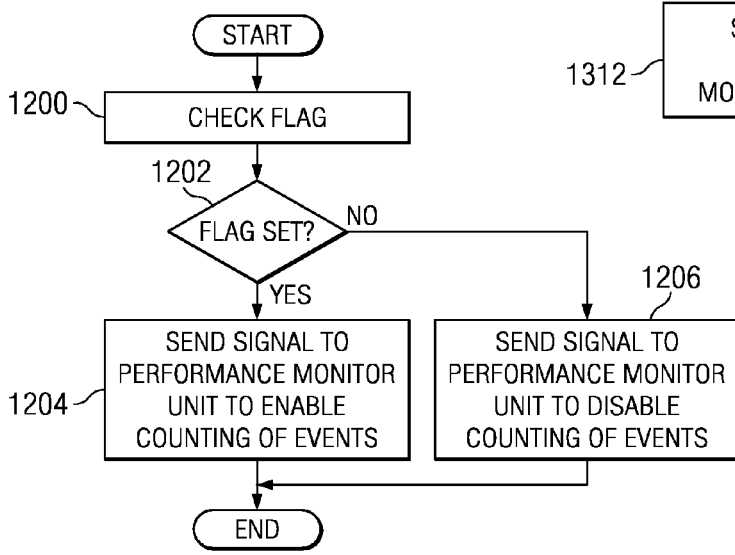
FIG. 12 is a flowchart of a process for selective counting of instructions in accordance with a preferred embodiment of the present invention.

With reference next to FIG. 12, a flowchart of a process for selective counting of instructions is depicted in accordance with a preferred embodiment of the present invention. The process illustrated in FIG. 12 may be implemented in an instruction cache, such as instruction cache 214 in FIG. 2.

The process begins by checking a flag (step 1200). A determination is made as to whether the flag is set (step 1202). If the flag is set, a signal is sent to the performance monitor unit to enable this unit to count events (step 1204) with the process terminating thereafter. Otherwise, a signal is sent to the performance monitor unit to disable the counting of events (step 1206) with the process terminating thereafter.

The processes illustrated in FIGS. 11 and 12 count events for all instructions after an instruction is associated with a performance indicator. In this manner, fewer bits may be used to toggle counting of events. Further, with the counting of all instructions, events associated with calls to external subroutines may be counted.

Figure 13:
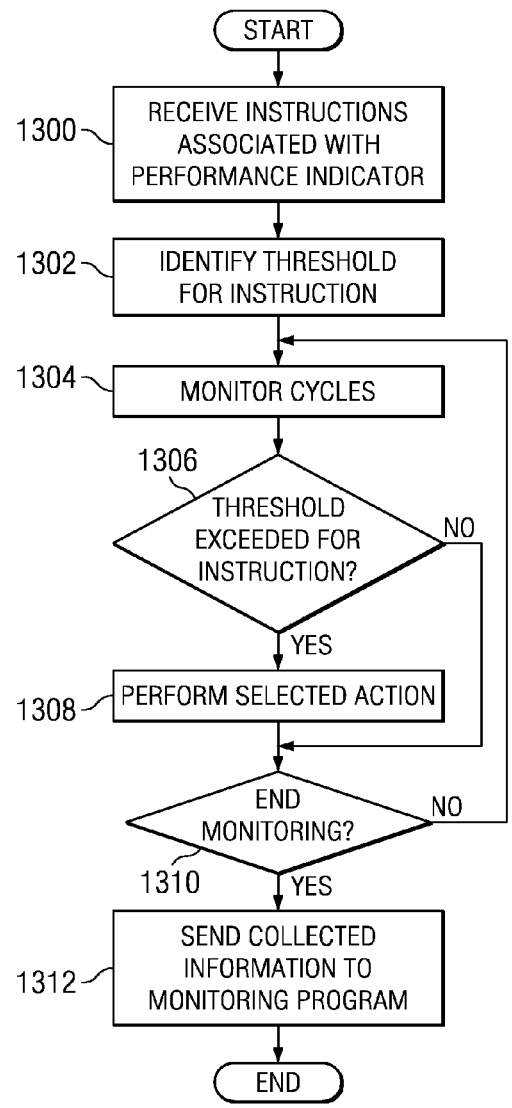
FIG. 13 is a flowchart of a process for identifying instructions exceeding a threshold in accordance with a preferred embodiment of the present invention.

Turning now to FIG. 13, a flowchart of a process for identifying instructions exceeding a threshold is depicted in accordance with a preferred embodiment of the present invention. The process illustrated in FIG. 13 may be implemented in an instruction cache, such as instruction cache 214 in FIG. 2.

The process begins by receiving an instruction associated with a performance indicator (step 1300). A threshold is identified for the instruction (step 1302). In these examples, the threshold relates to a number of processor or clock cycles needed to complete an instruction. If the cache latency or amount of time needed to access the cache exceeds the threshold value, that event is counted. The threshold value is set within the indicator in these examples.

For example, three bits may be used to set eight different values for the threshold. For example, "xx1"=10 cycles, "x1x"=50 cycles, and "1xx"=100 cycles. Some combination of these three bits may be used to set values for the threshold. More or fewer bits may be used and different values may be assigned to the bits depending on the specific implementation. The meaning of the bits may also be controlled through an interface, such as a set of registers that may be used to set the meaning of each of the bits. These registers are ones that are added to the processor architecture for this specific purpose.

Cycles for executing the instruction are monitored (step 1304). A determination is made as to whether the threshold has been exceeded for this instruction (step 1306). If the threshold has been exceeded, then a selected action is performed (step 1308). This selected action may take different forms depending on the particular implementation. For example, a counter may be incremented each time the threshold is exceeded. Alternatively, an interrupt may be generated. The interrupt may pass control to another process to gather data. For example, this data may include a call stack and information about the call stack. A stack is a region of reserved memory in which a program or programs store status data, such as procedure and function call addresses, passed parameters, performance monitor counter values, and sometimes local variables.

A determination is made as to whether monitoring is to end (step 1310). Step 1310 may be implemented one instruction at a time. When an instruction is executed or the threshold is exceeded, a signal is sent. In this example, execution of a single instruction results in one signal being sent. In the case in which multiple instructions may be executed at the same time, multiple signals may be needed to indicate the execution of each instruction. In some embodiments, a sampling approach may be supported, where the threshold is only supported for one instruction at a time. This may be done by only supporting thresholds for those instructions that are in a particular position in the processor's instruction queue. In other embodiments, one signal may be sent if at least one of the marked instructions exceeds the threshold. For each instruction in which a threshold is exceeded, a separate signal is raised or generated for that instruction.

If the monitoring is to end, the collected information is sent to a monitoring program (step 1312), with the process terminating thereafter. Otherwise, the process returns to step 1304 as described above. In step 1306, if the threshold is not exceeded for the instruction, the process proceeds directly to step 1310.

A similar process may be implemented in a data cache, such as data cache 216 in FIG. 2 to monitor accesses to memory locations. The process illustrated in FIG. 13 may be adapted to identify the cycles needed to access data in a memory location. As with the execution of instructions, counting occurs or an interrupt is generated when the amount of time needed to access the data in a memory location exceeds a specified threshold.

As with the other examples, these indicators may be included as part of the instruction or with the data in a memory location. Alternatively, these indicators may be found in a performance instrumentation shadow cache or memory in association with the instruction or data.

With reference to FIG. 14, a flowchart of a process for monitoring accesses to a memory location is depicted in accordance with a preferred embodiment of the present invention. The process illustrated in FIG. 14 may be implemented in a data cache, such as data cache 216 in FIG. 2. This process is used to count accesses to data in a memory location.

The process begins by receiving data associated with a performance indicator (step 1400). A determination is made as to whether a memory location for the data has been accessed (step 1402). If the memory location has been accessed, then a counter is incremented (step 1404). A determination is made as to whether monitoring is to end (step 1406). If monitoring of the memory location is to end, the process terminates. Otherwise, the process returns to step 1402. In step 1402, if the memory location is not accessed, then the process proceeds to step 1406.

Turning to FIG. 15, a block diagram illustrating components used for generating meta data, such as performance indicators, is depicted in accordance with a preferred embodiment of the present invention. The compiler supports directives embedded in the source that indicate the meta data to be generated. Compiler 1500 may generate instructions 1502 for execution and meta data for monitoring. As instruction or data cache pages are loaded into memory, the operating system program loader/linker and/or the performance monitoring program, reads the meta data generated by compiler 1500 and loads the meta data into memory, such as performance monitor section 1506, in these examples. The section itself is marked as meta data 1504. The processor may accept meta data 1504 in the format of the compiler generated section data in performance monitor section 1506 and populate processor's internal performance instrumentation shadow cache with the data. A block oriented approach is described with reference to FIG. 17 below.

In one embodiment the format simply has a performance instrumentation shadow cache entry for each of its block or sector references and moves meta data 1504 to its corresponding shadow entry or entries. Instead of having a performance instrumentation shadow cache, the internal format of the cache itself may be modified to contain meta data 1504. In embodiments where the instruction stream itself is modified to contain the meta data, then either the loader updates the instruction stream to contain the appropriate indicators and work areas or compiler 1500 has generated the code to contain meta data 1504. In either case, after the code is loaded, the processor receives the meta data 1504.

In addition, meta data 1504 may be placed into performance instrumentation shadow memory 1505 in association with instructions 1502. Compiler 1500 produces information in a table or debug data section. The performance monitoring program loads this information into shadow data areas in performance instrumentation shadow memory 1505. Alternatively, the debug areas may be automatically populated by the operating system and the processor working together.

Instructions 1502 may then be executed by processor 1508. Compiler 1500 may set a register such as mode register 1510 in processor 1508. When this register is set, processor 1508 looks at meta data 1504 in performance instrumentation shadow memory 1505 when executing instructions 1502 to determine whether performance indicators in meta data 1504 are associated with instructions that are being executed in instructions 1502. These performance indicators are handled using processes, such as those described above with reference to FIGS. 2-14. If mode register 1510 is not set, then meta data 1504 is ignored when instructions 1502 are executed.

A similar process may be performed with respect to data in memory location 1512. Depending on the particular implementation, meta data 1504 may be placed within the instruction or within the data, rather than in performance instrumentation shadow memory 1505. However, by placing meta data 1504 in performance instrumentation shadow memory 1505, the generation of meta data 1504 may be performed dynamically when meta data 1504 is placed in performance instrumentation shadow memory 1505.

This feature allows for selection and monitoring of instructions to occur without having to modify the program. In other words, compiler 1500 may generate meta data 1504 after instructions 1502 have been compiled for execution by processor 1508. Setting mode register 1510 causes processor 1508 to look for meta data 1504 in performance instrumentation shadow memory 1505 without having to modify instructions 1502. In these examples, meta data 1504 take the form of performance indicators that tell processor 1508 how to handle the execution of instructions 1502 and/or data accesses to memory location 1512.

Turning next to FIG. 16, a diagram illustrating meta data is depicted in accordance with a preferred embodiment of the present invention. Meta data 1600 is an example of meta data 1504 in FIG. 15. This meta data is generated by a compiler, such as compiler 1500.

In this example, meta data 1600 includes 5 entries, entry 1602, 1604, 1606, 1608, and 1610 as indicated by line 1612 in meta data 1600. Each of these entries includes an offset, a length, and a flag for describing the instrumentation of code in this example.

Entry 1602 has an offset of 0 with an entry length of 120 bytes. Flag 1614 indicates that all instructions within the range indicated by entry length 1616 need to be counted. In these examples, each instruction has a length of 4 bytes. Entry 1604 has an entry length of 4 bytes, which corresponds to an instruction. Flag 1618 indicates that an exception should be generated upon execution of this instruction.

In entry 1606, an instruction beginning at an offset of 160 bytes is associated with flag 1620. This flag indicates that the instruction should be counted if the threshold, 100 cycles, is exceeded.

Flag 1622 in entry 1608 indicates that tracing should start at the instruction having an offset of 256 bytes. Tracing stops as indicated by flag 1624 in entry 1610, which has a flag for the instruction at an offset of 512 bytes.

These flags are used to generate the performance indicators that are associated with the instructions. The operating system moves this meta data generated by the compiler and processes the meta data into a performance instrumentation shadow memory, such as performance instrumentation shadow memory 1506 in FIG. 15. Alternatively, this meta data may be placed into fields within the instructions depending on the particular implementation.

With reference now to FIG. 17, a diagram illustrating components involved in loading and maintaining a performance instrumentation shadow cache are depicted in accordance with a preferred embodiment of the present invention. In this example, existing cache 1700 contains primary segment 1702. Primary segment 1702 includes blocks 1704, 1706, 1708, 1710, 1712, 1714, 1716, 1718, 1720, 1722, and 1724. Translation table 1726 is used to provide a mapping for blocks 1704-1724 in primary segment 1702 to blocks in perfinst segment 1728. The data in this segment is placed into new performance instrumentation shadow cache 1730.

At program compile time, the compiler generates a new performance instrumentation data section as previously described. At program load time, the loader queries the processor to determine cache line size. The loader parses perfinst segment 1728 and constructs a shadow segment, in the format required by the processor, for any text or data segment that the loader loads. This shadow segment is placed into new performance instrumentation shadow cache 1730.

Each block in the shadow segment contains meta data for instructions or data in the corresponding primary cache block. This meta data includes, for example, flags, tag fields, threshold, and count fields for each tagged item in a block in primary segment 1702. This meta data also may include a flag that represents all the instructions or data in the block.

The loader constructs a table mapping, translation table 1726, for each block in primary segment 1702 to a corresponding perfinst block, such as block 1732, 1734, 1736, 1738, 1740, 1742, 1744, 1746, 1748, 1750, and 1752 in perfinst segment 1728. Further, the loader registers the head of this table, translation table 1726, and the location and size of primary segment 1702 with the processor.

At page replacement time, paging software provides a new interface to associate perfinst segment 1728 with the corresponding primary segment, primary segment 1702. When primary segment 1702 pages in or out, perfinst segment 1728 pages in or out as well.

At cache line replacement time, the processor contains new performance instrumentation shadow cache 1730 with cache frames directly associated with the frames in the existing data and instruction caches, such as existing cache 1700. When the processor's instruction or data cache loads a new line, the cache also must load the corresponding perfinst block into the performance instrumentation shadow cache, new performance instrumentation shadow cache 1730. The processor sees (from the registration data given by the loader at program load time) that the processor is bringing a block into its cache that has an associated perfinst segment, perfinst segment 1728. The processor looks in translation table 1726 associated with this segment, finds a reference to the perfinst block corresponding to the block it is about to load and loads the perfinst block into new performance instrumentation shadow cache 1730. In these examples, cache misses associated with meta data are not signaled or are treated differently from cache misses associated data in a primary cache block, such as in primary segment 1702.

With reference now to FIG. 18, a flowchart of a process for generating meta data for instructions is depicted in accordance with a preferred embodiment of the present invention. The process illustrated in FIG. 18 may be implemented by a performance monitoring program.

The process begins by identifying an instruction for profiling (step 1800). This instruction may be, for example, one that has been executed more than a selected number of times. Meta data is generated for the identified instruction (step 1802). This meta data takes the form of a performance indicator. The performance indicator may, for example, increment a counter each time the instruction is executed, increment a counter if the number of cycles needed to execute the instruction exceeds a threshold value, toggle counting of events for all instructions for all events after this instruction, or count events occurring in response to executing the instruction. In a preferred embodiment, the counters are in the associated performance instrumentation shadow cache and take some number of bits to allow for a one to one correspondence between the data or instructions in the cache and the bits reserved for counting.

The meta data is then associated with the instruction (step 1804). Next, a determination is made as to whether more instructions are present for processing (step 1806). If additional instructions are present, the process returns to step 1800. Otherwise, the process terminates. A similar process may be used to dynamically generate meta data for data in memory locations.

Figure 19:
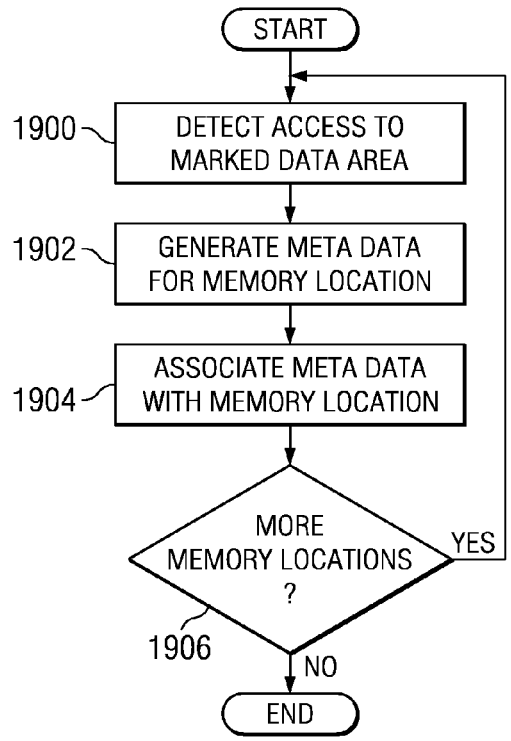
FIG. 19 is a flowchart of a process for generating meta data for memory locations in accordance with a preferred embodiment of the present invention.

With reference now to FIG. 19, a flowchart of a process for generating meta data for memory locations is depicted in accordance with a preferred embodiment of the present invention. The process illustrated in FIG. 19 may be implemented in a compiler such as compiler 1500 in FIG. 15.

The process begins by identifying a memory location for profiling (step 1900). Step 1900 occurs by detecting access to a marked location. Meta data is generated for the identified memory location (step 1902). This meta data takes the form of a performance indicator. The performance indicator may, for example, increment a counter each time the memory location is accessed, increment a counter if the number of cycles needed to access the memory location exceeds a threshold value, or toggle counting of all accesses to memory locations. The meta data is then associated with the memory location (step 1904). Next, a determination is made as to whether more memory locations are present for processing (step 1906). If additional memory locations are present, the process returns to step 1900. Otherwise, the process terminates.

Figure 20:
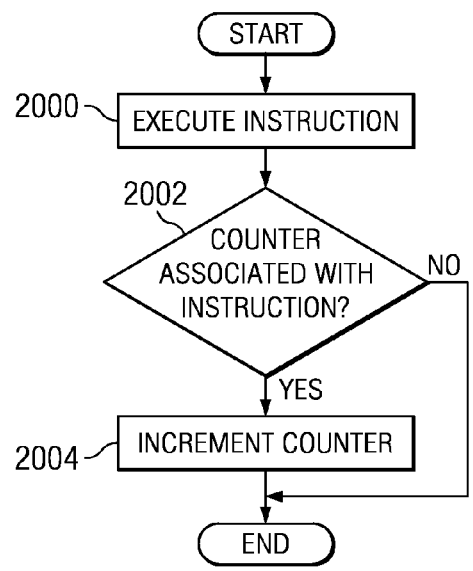
FIG. 20 is a flowchart of a process for counting execution for particular instructions in accordance with a preferred embodiment of the present invention.

Turning now to FIG. 20, a flowchart of a process for counting execution for particular instructions is depicted in accordance with a preferred embodiment of the present invention. The process illustrated in FIG. 20 may be implemented in an instruction cache such as instruction cache 214 in FIG. 2.

The process begins by executing an instruction (step 2000). A determination is made as to whether a counter is associated with the instruction (step 2002). The counter may be included in a field within the instruction or may be in a performance instrumentation shadow memory. If a counter is associated with the instruction, the counter is incremented (step 2004) with the process terminating thereafter. Otherwise, the process terminates without incrementing the counter. The counter may be reset if the counter exceeds a threshold value.

When the counter is implemented as part of the instructions, the counter may be of limited size. In this case, a threshold value for the counter may be set to indicate when the counter is in danger of overflowing. The counter may then be reset after the value has been read. This value may be read by a performance monitor unit or by a program used to analyze data. APIs may be implemented to access this data.

Figure 21:
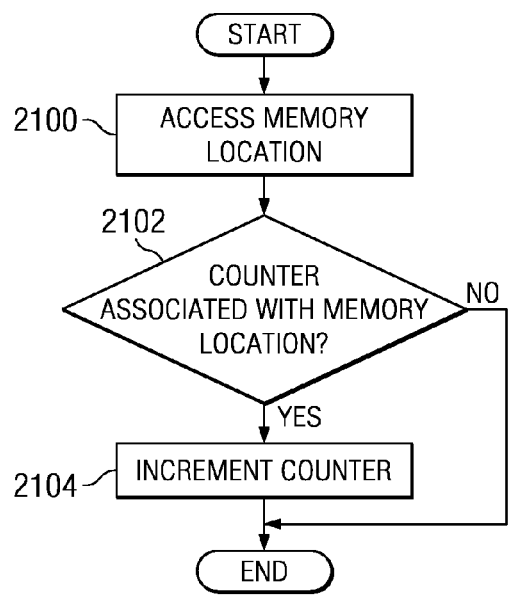
FIG. 21 is a flowchart of a process for counting accesses to a particular memory location in accordance with a preferred embodiment of the present invention.

Turning now to FIG. 21, a flowchart of a process for counting accesses to a particular memory location is depicted in accordance with a preferred embodiment of the present invention. The process illustrated in FIG. 21 may be implemented in a data cache, such as data cache 216 and instruction cache 214 in FIG. 2.

The process begins by detecting access to a memory location (step 2100). A determination is made as to whether a counter is associated with the memory location (step 2102). The counter may be included within the memory location or may be in a performance instrumentation shadow memory. If a counter is associated with the memory location, the counter is incremented (step 2104) with the process terminating thereafter. Otherwise, the process terminates without incrementing the counter.

Figure 22:
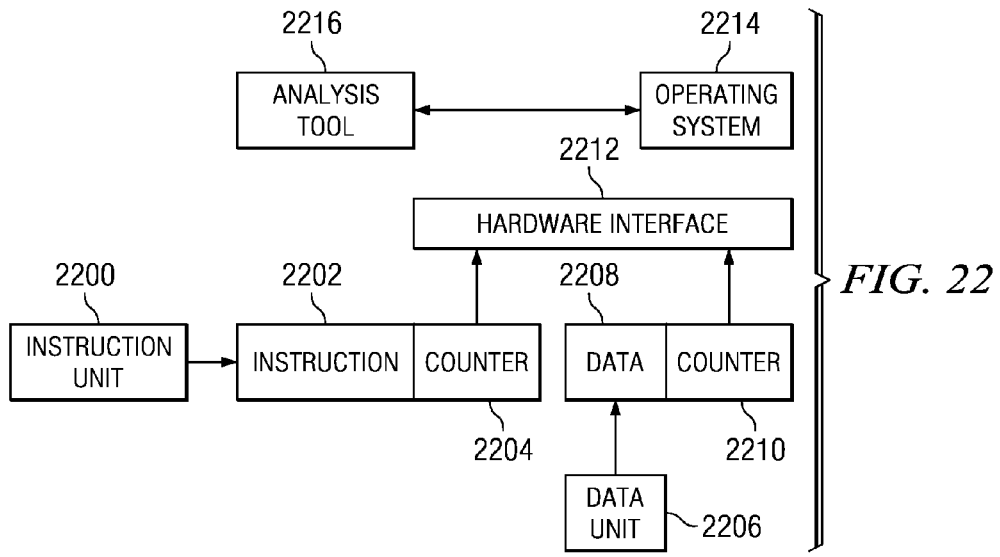
FIG. 22 is a diagram illustrating components used in accessing information collected with respect to the execution of instructions or the access of memory locations in accordance with a preferred embodiment of the present invention.

With reference next to FIG. 22, a diagram illustrating components used in accessing information collected with respect to the execution of instructions or the access of memory locations in accordance with a preferred embodiment of the present invention. In this example, instruction unit 2200 executes instruction 2202 and increments counter 2204. This counter is incremented each time instruction 2202 is executed. In this example, instruction unit 2200 may be implemented as instruction cache 214 in FIG. 2.

When the instruction or data cache pages are loaded into memory, the operating system program loader/linker and/or the performance monitoring program, reads the meta data generated by the compiler and determines that counting is associated with instruction or data access, then the loading process allocates data areas to maintain the counters as part of its perfinst segment. The size of the counters and the granularity of the data access determine the amount of work area to be allocated.

In a simple case, the granularity of the data or instruction access could be word size (so that an access to any byte in the word is considered an access) and the counts could also be a word size. In this case, one to many mapping is present between the primary segment and the perfinst segment (a full word to contain the counts or threshold is not required). The loading process allocates a shadow page or pages and tells the processor to use the shadow page(s) to contain the counts. Details of this mapping are described above with reference to FIG. 17. The cache unit in the processor maintains a shadow block entry to indicate the corresponding page to contain the count information. Different mapping and different levels of support could be provided.

In an alternative embodiment, the compiler allocates the work areas to maintain the counts and indicates the placement of these work areas in its generated data areas. An entry in the meta data could indicate the start of the data, the number of bytes of data, granularity of the data, the start of the count area, and the granularity of each counting unit. In either case, the meta data is loaded into the processor and the processor populates its internal (shadow) cache with the meta data. In illustrative embodiments in which the instruction stream itself is modified to contain the meta data, then either the loader updates the instruction stream to contain the appropriate indicators and work areas or the compiler has generated the code to contain the meta data. In either case, after the code is loaded, the processor receives the meta data.

Data unit 2206 may be implemented as data cache 206 in FIG. 2. In this example, each time data 2208 is accessed, counter 2210 is incremented. Data 2208 and counter 2210 are both located in a particular memory location. In these examples, a new instruction may be employed in which the instruction is called ReadDataAccessCount (RDAC) that takes a data address and a register and puts the count associated with that data address in the register.

Each of these events, instruction execution and data access, results in incrementing of a counter. The mechanism of the present invention provides an interface, hardware interface 2212, to access this collected data. In these examples, hardware interface 2212 takes the form of an application programming interface (API) for operating system 2214. In this way, analysis tool 2216 may obtain data from counter 2204 and counter 2210. Analysis tool 2216 may take many forms, such as for example, Oprofile, which is a known system wide profiler for Linux systems. Although the examples in FIG. 22 illustrate providing an interface to an instruction unit and a data unit, hardware interface 2212 may be implemented to provide access to information from other units in a processor. For example, APIs may be created for hardware interface 2212 that allows for accessing information located in counters in a performance monitor unit, such as counter 241 and 242 in performance monitor unit 240 in FIG. 2.

Figure 23:
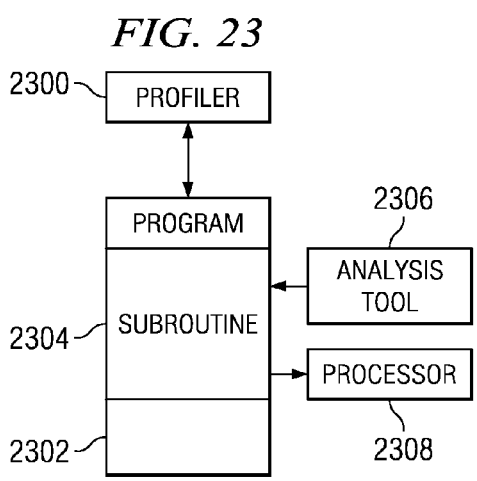
FIG. 23 is a block diagram of components used in autonomically modifying code in a program to allow selective counting or profiling of sections of code in accordance with a preferred embodiment of the present invention.

In FIG. 23, a block diagram of components used in autonomically modifying code in a program to allow selective counting or profiling of sections of code in accordance with a preferred embodiment of the present invention. In this example, profiler 2300 is a program, such as tprof, that may be used to identify routines of high usage in a program, such as program 2302. In these examples, "tprof" is a timer profiler, which ships with the Advanced Interactive Executive (AIX) operating system from International Business Machines (IBM) Corporation. This program takes samples, which are initiated by a timer. Upon expiration of a timer, tprof identifies the instruction executed. Tprof is a CPU profiling tool that can be used for system performance analysis. The tool is an example of an analysis tool and based on the sampling technique which encompasses the following steps: interrupt the system periodically by time or performance monitor counter; determine the address of the interrupted code along with process id (pid) and thread id (tid); record a TPROF hook in the software trace buffer; and return to the interrupted code.

Alternatively, a fixed number of counts of a performance monitor counter may be used instead of a timer. This program profiles subroutines that are used to indicate where time is spent within a program. A program having usage over a certain threshold also is referred to as being "hot". By using information from profiler 2300, routines of interest, such as subroutine 2304 in program 2302 may be identified.

With this information, the instructions in subroutine 2304 may be autonomically modified by analysis tool 2306 to allow counting of the execution of subroutine 2304. Additional routines may be identified for modification by analysis tool 2306. For example, subroutine 2304 also may be identified as a routine of interest with the instructions of this routine being modified to allow counting of the execution of subroutine 2304. The modification of the code in these routines includes associating performance indicators with one or more instructions within each of these subroutines.

After the instructions in these routines have been modified by analysis tool 2306, program 2302 is then executed by processor 2308. Processor 2308 executes program 2302 and provides counts for these routines. For example, the counting of instructions executed and the number of cycles used in executing a routine may be performed by processor 2308 using the mechanisms described above.

Figure 24:
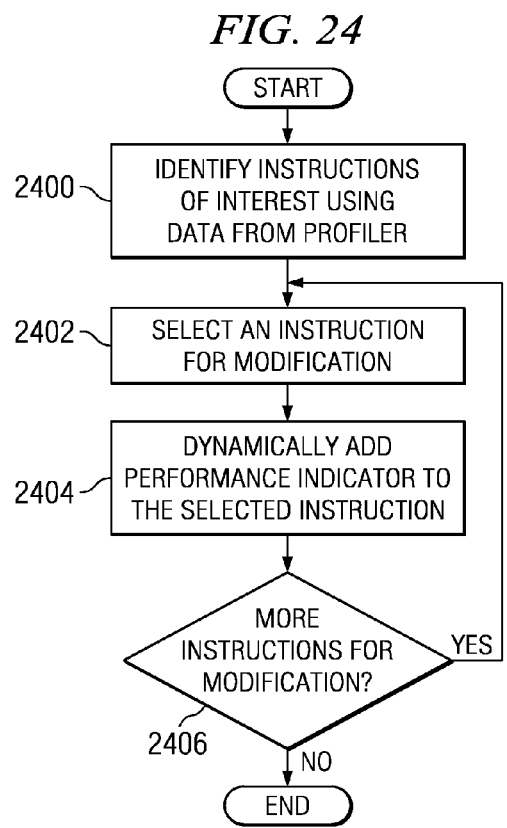
FIG. 24 is a flowchart of a process for dynamically adding or associating performance indicators to an instruction in accordance with a preferred embodiment of the present invention.

With reference to FIG. 24, a flowchart of a process for dynamically adding or associating performance indicators to an instruction is depicted in accordance with a preferred embodiment of the present invention. The process illustrated in FIG. 24 may be implemented in a program, such as analysis tool 2306 in FIG. 23. An analysis tool is a program that is used to obtain metrics about the execution of a program. These metrics may be any measurable parameter, such as execution time, routines executed, particular instructions executed, and memory locations accessed.

The process begins by identifying instructions of interest using data from a profiler (step 2400). This profiler may be, for example, a timer profiler found in AIX. An instruction from the identified instructions is selected for modification (step 2402). Thereafter, a performance indicator is dynamically added to the selected instruction (step 2404).

In step 2404, the instruction may be added in a manner such that the instructions do not need to be modified for execution. A performance instrumentation shadow memory, such as performance instrumentation shadow memory 1506 in FIG. 15, may be employed to hold the performance indicators. In this situation, a register is set in the processor to indicate that the performance instrumentation shadow memory should be checked for performance indicators when executing instructions.

A determination is then made as to whether additional identified instructions are present for modification (step 2406). If additional instructions are present for modification, the process returns to step 2402. Otherwise, the process terminates.

Turning next to FIG. 25, a diagram illustrating components used to scan pages through associating performance indicators with instructions in a page is depicted in accordance with a preferred embodiment of the present invention. The mechanism of the present invention uses performance indicators to allow instrumenting or modifying of instructions in a program one page at a time.

In this example, program 2500 contains three pages, page 2502, page 2504, and page 2506. Scanning daemon 2508 associates performance indicators with instructions in program 2500 one or more pages at a time. For example, the instructions in page 2502 may be associated with performance indicators by scanning daemon 2508. Program 2500 is then executed by processor 2510. Data from the execution of program 2500 may then be collected. This data includes, for example, counts of events occurring in response to instructions in page 2502, counting the number of times each instruction in page 2502 is executed, and/or identifying the number of visits to page 2502.

Next, scanning daemon may remove the performance indicators from instructions in page 2502 and associate performance indicators with instructions in page 2504. Program 2500 is then executed again by processor 2510, and data from execution of this program is collected. Then, instructions in page 2506 may be modified in program 2500 executed to collect data on that page.

In this manner, usages of routines typically not recorded by programs, such as a timer profiler, may be identified. A timer profiler may not record some usages of routines because interrupts may be inhibited or the timing of samples may cause synchronous non-random behavior. By modifying instructions in program 2500, counting a routine or other modules may be obtained in which the counts are unbiased and the system is unperturbed. In this manner, interrupt driven counting is avoided. Further, although the instrumenting of code is one page at a time, other groupings of instructions may be used in scanning a program, such as modules that form the program. For example, the grouping may be a single executable program, a library, a group of selected functions, and a group of selected pages.

Turning next to FIG. 26, a flowchart of a process for adding indicators to instructions in a page is depicted in accordance with a preferred embodiment of the present invention. The process illustrated in FIG. 26 may be implemented in a program, such as scanning daemon 2508 in FIG. 25.

First, a selection of pages is identified (step 2600). In this example, the pages are those in the program that are to be scanned or instrumented. Next, a page within the selection of pages is selected for modification (step 2602). Indicators are then associated with all of the instructions in the selected page (step 2604). The program is then executed (step 2606). Next, a determination is made as to whether all the pages with the selection have been scanned (step 2608). If all of the pages have been scanned, the process terminates thereafter. However, if not all pages have been scanned, the next page to be scanned is selected (step 2610), with the process returning to step 2604 as described above.

The process illustrated in FIG. 26 shows scanned groupings of instructions as pages. Depending on the particular implementation, other types of groupings of instructions, such as modules that form a program, may be scanned or instrumented in this manner.

A program is employed to identify a caller from a routine from the information found in a call stack. This program allows for an identification of what has occurred in a routine and provides a summary of what has occurred in a program by identifying function calls that have been made. This program, however, requires instructions inserted in the code to obtain this information.

The mechanism of the present invention allows for identifying calls and returns without having to perform special code instrumentation. In particular, the function of generating an interrupt on a specific set of instructions may be used to gather information about the system and applications. In these examples, instructions for calls and returns are associated with a performance indicator that generates an interrupt.

By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step or frame-by-frame. The process may also be described as "unwinding" as the process must obtain and process the stack frames that point to one another, and these pointers and their information must be "unwound" through many pointer dereferences.

The stack unwind follows the sequence of function/method calls at the time of an interrupt and is generated in response to execution of an instruction associated with a performance indicator. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during interrupt processing or at post-processing initiated by execution of an instruction associated with a particular performance indicator, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now to FIG. 27, a diagram depicting call stack containing stack frames is depicted in accordance with a preferred embodiment of the present invention. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 2700 includes information identifying the routine that is currently running, the routine that invoked it, and so on, all the way up to the main program. Call stack 2700 includes a number of stack frames 2702, 2704, 2706, and 2708. In the depicted example, stack frame 2702 is at the top of call stack 2700, while stack frame 2708 is located at the bottom of call stack 2700. The top of the call stack is also referred to as the "root". The interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame).

By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When an interrupt occurs, the first parameter acquired is the program counter value. The next value is the pointer to the top of the current stack frame for the interrupted thread. In the depicted example, this value would point to EBP 2708*a* in stack frame 2708. In turn, EBP 2708 points to EBP 2706*a* in stack frame 2706, which in turn points to EBP 2704*a* in stack frame 2704. In turn, this EBP points to EBP 2702*a* in stack frame 2702. Within stack frames 2702-2708 are EIPs 2702*b*-2708*b*, which identify the calling routine's return address. The routines may be identified from these addresses. Thus, routines are defined by collecting all of the return addresses by walking up or backwards through the stack.

Obtaining a complete call stack may be difficult in some circumstances, because the environment may make tracing difficult, such as when an application having one call stack makes a call to a kernel having a different call stack. The hardware support provided by the mechanism of the present invention avoids some of these problems.

Turning next to FIG. 28, a flowchart of a process for identifying events associated with call and return instructions in which data is collected from a performance monitor unit is depicted in accordance with a preferred embodiment of the present invention. The process illustrated in FIG. 28 may also be implemented for an analysis tool, such as analysis tool 2216 in FIG. 22.

The process begins by identifying call and return instructions (step 2800). The instructions for calls and returns are ones of interest for determining when a routine has been called and when a routine completes. This may be accomplished for interrupts, interrupt returns, system calls, and returns from system calls.

Next, performance indicators are associated with the identified call and return instructions (step 2802). The program is then executed (step 2804), and data is collected from the performance monitor unit (step 2806) with the process terminating thereafter. This information may be collected through interfaces, such as hardware interface 2212 illustrated in FIG. 22 in which APIs are employed to obtain data collected by the different functional units in a processor.

With this data, identifications of callers of routines may be made. This information may be used to generate data structures, such as trees to track and present information regarding the execution of the program. This generation of data structures may be implemented using processes similar to those provided in analysis tools.

Turning next to FIG. 29, a flowchart of a process for identifying routines that have been executed more than a selected number of times is depicted in accordance with a preferred embodiment of the present invention. The process illustrated in FIG. 29 may be implemented in a functional unit within a processor, such as instruction cache 214 in FIG. 2. This process is used to identify counts of instructions that are executed and to generate an interrupt when these instructions have occurred more than some selected number of times.

First, a determination is made as to whether an execution of a selected instruction is detected (step 2900). This determination is made by examining each instruction that is executed to see whether a performance indicator is associated with the instruction. These performance indicators may be associated with the instructions through different tools, such as compiler 1500 in FIG. 15 or analysis tool 2216 in FIG. 22.

If execution of an instruction containing a performance indicator is not identified, the process returns to step 2900 until a selected instruction is detected. If a selected instruction is identified as being executed, a counter with a set threshold is incremented for that selected instruction to count how often that particular instruction is executed (step 2902). In these examples, each instruction identified for monitoring is assigned a counter.

Next, a determination is made as to whether the set threshold has been reached (step 2904). Threshold values are initially determined by using documented cache miss times, for each of the cache levels. However, increasing times are used to determine problems caused by cache interventions (accesses from other processors). Repeated runs with different values may be made to identify the areas with the worst performance.

In these examples, the instruction may be associated with an indicator that includes an indication that execution of the instruction is to be monitored as well as providing a counter. Further, count criteria may be included to identify when an interrupt is to be generated. For example, an interrupt may be generated when the instruction has been executed more than thirteen times.

If the threshold has not been reached, the process returns to step 2900 as described above. If the set threshold has been reached, an interrupt is sent to the monitoring program (step 2906) with the process terminating thereafter. This interrupt may be sent to an interrupt unit, such as interrupt unit 250 in FIG. 2, which passes control to the appropriate procedure or process to handle the interrupt.

This process may be especially useful for routines with many branches. In this case, all branch instructions would be flagged for counting. Information derived by this type of counting may be useful for identifying improvements for compiler and just-in-time (JIT) code generation by minimizing branches or adjusting hint flags, supported in the instruction architecture of the processor that is used.

Turning next to FIG. 30, a flowchart of a process for examining a call stack and identifying a caller of a routine when a particular instruction is executed more than some selected number of times is depicted in accordance with a preferred embodiment of the present invention. The process illustrated in FIG. 7 may be initiated by an interrupt unit, such as interrupt unit 250 in FIG. 2. This process is used to identify a call in a routine and may be used to recursively obtain information for callers.

First, a call stack is examined and the caller of a routine is identified (step 3000). Next, a count of the number of instructions executed is captured from the instruction cache (step 3002). The count is for a counter used in step 2902 in FIG. 29. The counter is then reset (step 3004) with control thereafter returned from the interrupt (step 3006). The information obtained in the process in FIG. 30 may be used to identify additional routines for monitoring to recursively identify callers of routines.

Figure 31:
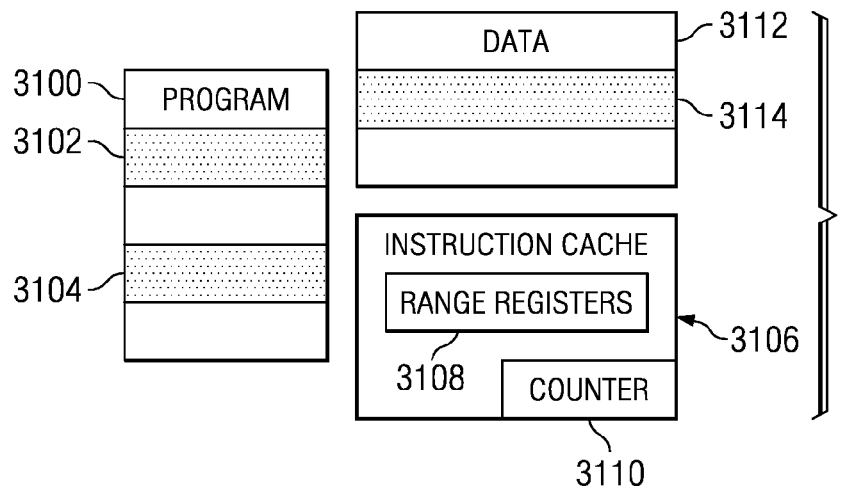
FIG. 31 is a diagram illustrating ranges of instructions and data that has been selected for monitoring in accordance with a preferred embodiment of the present invention.

Turning next to FIG. 31, a diagram illustrating ranges of instructions and data that has been selected for monitoring is depicted in accordance with a preferred embodiment of the present invention. In this example, program 3100 includes instruction range 3102 and 3104. Each of these ranges has been identified as ones of interest for monitoring. Each of these ranges is set within an instruction unit, such as instruction cache 214 in FIG. 2. Each range is used to tell the processor the number of instructions executed in a range, as well as the number of times a range is entered during execution of program 3100.

Instruction cache 3106 uses range registers 3108 to define instruction ranges. These registers may be existing registers or instruction cache 3106 may be modified to include registers to define instruction ranges. These ranges may be based on addresses of instructions. Additionally, range registers 3108 may be updated by various debugger programs and performance tools.

If an instruction is executed in a range, such as instruction range 3102 or instruction range 3104, a counter is incremented in instruction cache 3106. Alternatively, the instruction may be sent to a performance monitor unit, such as performance monitor unit 240 in FIG. 2. The performance monitor unit tracks the count of the number of instructions executed within the range and the number of times the instruction range is entered in these examples.

Data accesses may be monitored in a similar fashion. For example, data 3112 includes data range 3114. Data accesses to data range 3114 may be counted in a similar fashion to execution of instructions within instruction range 3102 or instruction range 3104. These ranges may be defined in registers within a data unit, such as data cache 216 in FIG. 2. These ranges for data may be defined in the register as a range of memory locations for the data.

Figure 32:
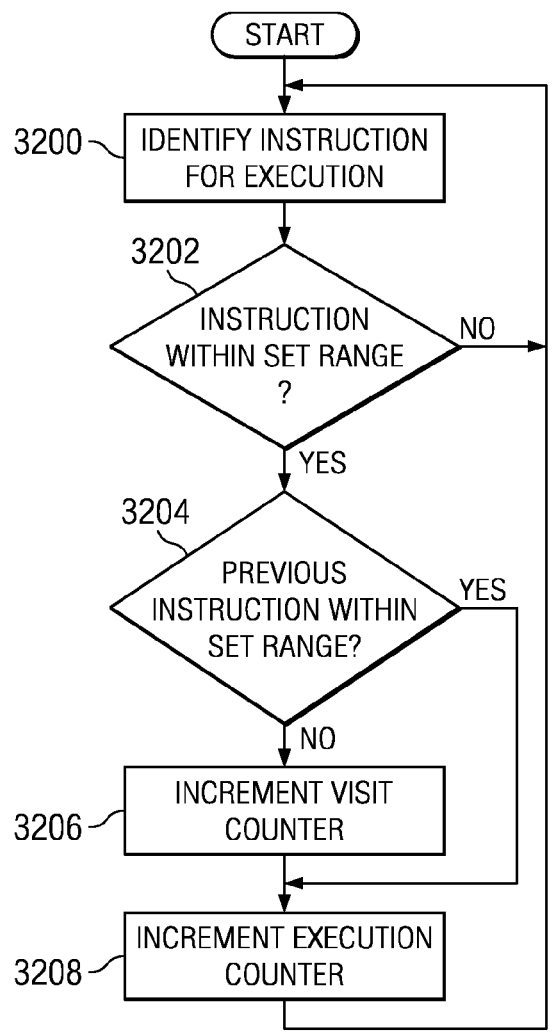
FIG. 32 is a flowchart of a process for counting the number of visits to a set range as well as the number of instructions executed within a set range in accordance with a preferred embodiment of the present invention.

Turning next to FIG. 32, a flowchart of a process for counting the number of visits to a set range as well as the number of instructions executed within a set range is depicted in accordance with a preferred embodiment of the present invention. The process illustrated in FIG. 32 may be implemented in an instruction unit, such as instruction cache 214 in FIG. 2.

First, an instruction is identified for execution (step 3200). Next, a determination is made as to whether the instruction is within a set range of instructions (step 3202). The range may be identified by examining registers defining one or more instruction ranges. If the instruction is not within a set range of instructions, the process returns to step 3200 as described above. If the instruction is within a set range of instructions, a determination is made as to whether the previous instruction was within the set range of instructions (step 3204). If the previous instruction was not within the set range of instructions, a visit counter is incremented to tell the processor how many times the instruction range is entered (step 3206). Additionally, an execution counter is incremented to count the number of instructions executed within the set range of instructions (step 3208) with the process returning to step 3200 thereafter.

With reference again to step 3204, if the previous instruction was within the set range of instructions, the process proceeds to step 3208 as described above.

A similar process to the one illustrated in FIG. 32 may be implemented for access to data. In this case, the process would typically be implemented in a data unit, rather than in an instruction unit.

Thus, the present invention provides an improved method, apparatus, and computer instructions for providing assistance in monitoring execution of programs. The mechanism of the present invention includes employing an indicator that is recognized by the processor to enable counting the execution of an instruction associated with the indicator. Various types of counting as described above are enabled through this mechanism. Further, with the information provided through the use of associating indicators with particular instructions, the mechanism of the present invention also provides for various types of adjustments to programs in monitoring and analyzing performance of programs. Further, as described above, programs may be automatically adjusted to allow for monitoring of selected instructions and even routines and modules without having to modify the program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, instead of using a field in an instruction or in a bundle, a new instruction or operation code may be used to indicate that a subsequent instruction, or a subsequent set of instructions are marked instructions. Also, the architecture of a processor may be changed to include additional bits if spare fields for performance indicators are unavailable in the case in which it is desirable to include performance indicators within fields in the instructions. Also, although examples of events, such as execution of the instruction, time, such as clock or processor cycles, needed to execute an instruction, time to access data, entry into a section of code, have been given, these examples are not meant to limit the present invention to the types of events that can be counted. Any event relating to execution of an instruction or access to a memory location may be counted using the mechanisms of the present invention.

The illustrative embodiments were chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
    a performance monitor unit, wherein the performance monitor unit counts occurrences of at least one selected event that is associated with execution of an instruction when a signal is received; and
    an instruction cache, wherein the instruction cache receives the instruction and sends the signal to the performance monitor unit to count the occurrences of the at least one selected event that is associated with execution of the instruction when it is determined that an indicator associated with the instruction is present responsive to receiving the instruction in the instruction cache.

2. The data processing system of claim 1, wherein the instruction is located in a bundle received by the instruction cache.

3. The data processing system of claim 2, wherein the indicator is located in a performance instrumentation shadow memory in association with the instruction.

4. A data processing system for processing instructions, the data processing system comprising:
    determining means, responsive to receiving an instruction in an instruction cache in a processor in the data processing system, for determining whether an indicator associated with the instruction is present;
    responsive to determining that an indicator associated with the instruction is present, enabling means for enabling counting occurrences of at least one selected event that is associated with execution of the instruction;
    counting means for counting the occurrences of the at least one selected event during the execution of the instruction if counting is enabled for the instruction; and
    responsive to determining that an indicator associated with the instruction is not present, means for executing the instruction without enabling counting the occurrences of the at least one selected event.

5. The data processing system of claim 4, wherein the counting means comprises:
    incrementing means for incrementing a counter associated with the indicator for each occurrence of the at least one selected event.

6. A data processing system for monitoring access to data, the data processing system comprising:
- identifying means for identifying a memory location associated with an indicator; and
- enabling means for enabling counting of occurrences of at least one selected event that is associated with accesses to the memory location; wherein the enabling means comprises:
  - sending means for sending a signal from a data cache to a performance monitor unit to enable the performance monitor unit to count the occurrences of the at least one selected event that is associated with accesses to the memory location; and
  - incrementing means for incrementing a counter in the performance monitor unit for each occurrence of the at least one selected event.

7. A computer program product containing instructions stored in a computer readable non-transitory medium for processing instructions, the computer program product comprising:
- first instructions, responsive to receiving an instruction in an instruction cache in a processor in the data processing system, for determining whether an indicator associated with the instruction is present;
- second instructions, responsive to determining that an indicator associated with the instruction is present, for enabling counting of occurrences of at least one selected event that is associated with execution of the instruction;
- third instructions for counting the occurrences of the at least one selected event during the execution of the instruction if counting is enabled for the instruction; and
- fourth instructions, responsive to determining that an indicator associated with the instruction is not present, for executing the instruction without enabling counting the occurrences of the at least one selected event.

8. The computer program product of claim 7, wherein the third instruction comprises:
- sub-instructions for incrementing a counter associated with the indicator for each occurrence of the at least one selected event.

* * * * *